(12) United States Patent
Sato et al.

(10) Patent No.: US 6,279,104 B1
(45) Date of Patent: *Aug. 21, 2001

(54) DEBUGGING SYSTEM FOR PARALLEL PROCESSED PROGRAM AND DEBUGGING METHOD THEREOF

(75) Inventors: Yuji Sato; Norihisa Murayama, both of Shizuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,952

(22) Filed: Mar. 26, 1998

(30) Foreign Application Priority Data

Jul. 22, 1997 (JP) .................................................. 9-196237

(51) Int. Cl.⁷ ...................................................... G06F 11/00
(52) U.S. Cl. ........................... 712/227; 712/228; 712/229
(58) Field of Search ..................... 395/704; 345/440; 709/102, 300; 712/227, 228, 229

(56) References Cited

U.S. PATENT DOCUMENTS

| | | | |
|---|---|---|---|
| 5,179,702 | * 1/1993 | Spix et al. | 709/102 |
| 5,325,530 | * 6/1994 | Mohrmann | 395/704 |
| 5,640,500 | * 6/1997 | Taylor | 345/440 |
| 5,687,375 | * 11/1997 | Schwiegelshohn | 395/704 |
| 5,745,760 | * 4/1998 | Kawamura et al. | 709/300 |
| 5,963,746 | * 10/1999 | Barker et al. | 712/20 |

* cited by examiner

Primary Examiner—Reba I. Elmore
(74) Attorney, Agent, or Firm—Staas & Halsey LLP

(57) ABSTRACT

A debugging system for use with a data parallel processing apparatus is disclosed. Sequential debuggers debug a plurality of parallel processes. The processed result is output as reply information to a management processor. The management processor knows the reason why it has received reply information and manages debugging statuses of the individual sequential debuggers corresponding to the reply information against the debug command.

35 Claims, 25 Drawing Sheets

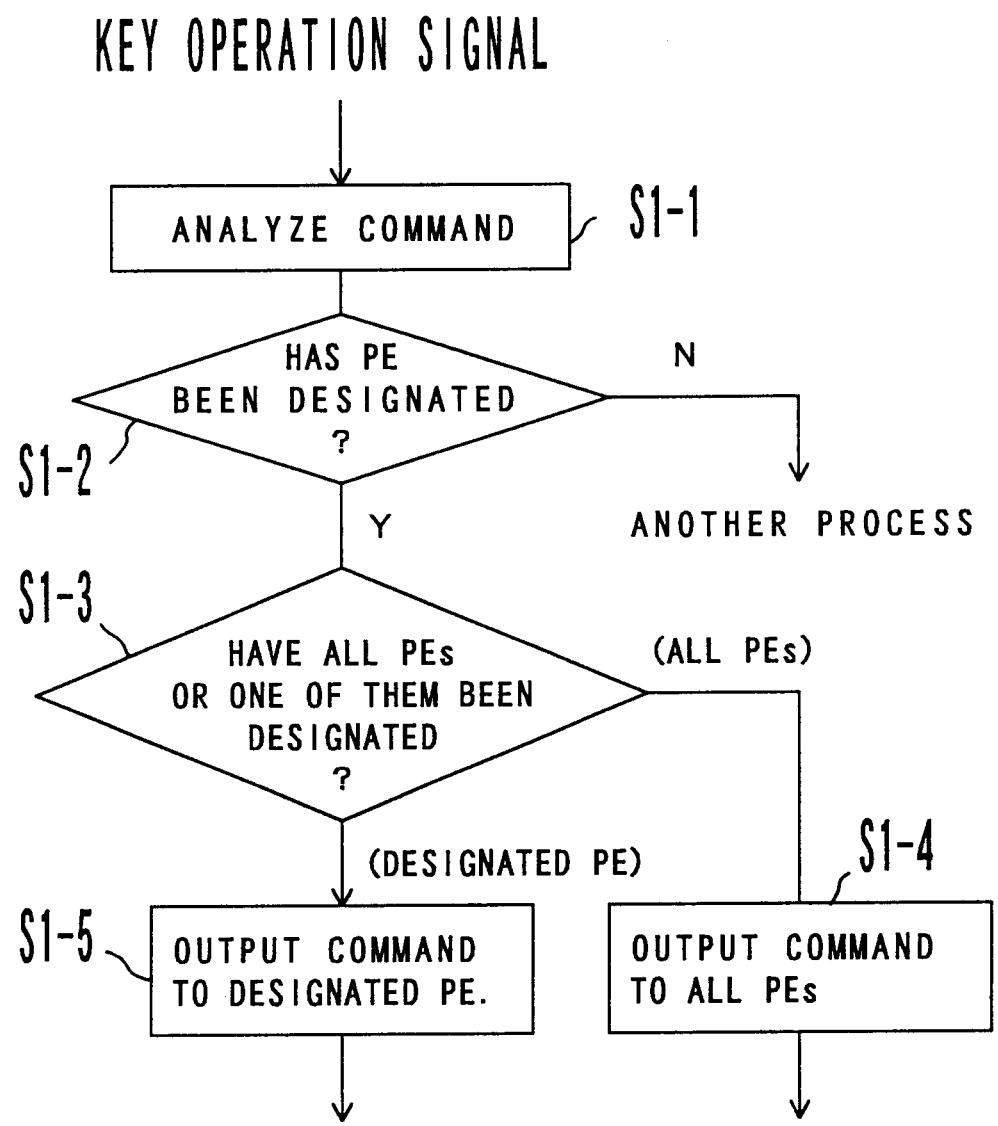
F I G. 8

| index | 1~25 | 25~50 | 51~75 | 76~100 |
|---|---|---|---|---|
| Pe | 1 | 2 | 3 | 4 |

DEBUGGING SYSTEM FOR PARALLEL PROCESSED PROGRAM AND DEBUGGING METHOD THEREOF

BACKGROUND OF THE INVENTION

1. Field of the Invention

The present invention relates to a data parallel processing apparatus for processing data with a plurality of processor elements. More particularly, the present invention relates to a debugging system for a parallel processed program that drives the processing apparatus and a debugging method thereof.

2. Description of the Related Art

In a scientific and engineering parallel computer that repeats the same calculating process or the calculations with varied parameters, a data parallel process of which the calculating process is divided by a plurality of processors is performed. In the data parallel processing apparatus, since the same calculation program is executed by a plurality of processor elements in parallel, they perform respective calculating processes with respective data and variables so as to accomplish a high speed calculating process.

On the other hand, in the final stage of software development, a debugging process for checking out source code, executable format, and so forth and for finding errors of a program and of data, and variables, in the program is essential. Conventionally, the debugging process is performed by, for example, the following debugger.

The debugger debugs programs of individual processor units. This type of debugger is referred to as a sequential debugger. The sequential debugger debugs only a process program in one processor element. The debugger tracks the operation of a program of each processor element, stops for example a source program at a particular line, then checks out data and content of variables.

However, when a program for the data parallel processing apparatus with a plurality of processor elements connected in parallel is debugged, a complicated debugging process should be performed for each processor element. Thus, the debugging process is ineffective and thereby takes a long time.

SUMMARY OF THE INVENTION

An object of the present invention is to provide a debugging system for effectively performing a debugging process for a parallel processed program of a data parallel processing apparatus, and thereby largely contributing supporting program development as an effective debugging tool of a parallel processed program and a debugging method thereof.

The present invention is accomplished by a debugging system for use with a data parallel processing apparatus having a plurality of processor element for processing the same process in parallel, the debugging system comprising a plurality of sequential debuggers for debugging process programs of the processor elements, and a management processor for outputting a debug command to the sequential debuggers, causing the sequential debuggers to debug the process programs, receiving reply information therefrom as the debugged results, and managing a debugging process for the data parallel processing apparatus.

The plurality of processor elements (sometimes referred to as PEs) process the same program in parallel. For example, the processor elements process a parallel program in the scientific and engineering calculating process. Each processor element can access a shared memory shared by each processor element along with a dedicated local memory therof. For example, each processor can access the shared memory along with a relevant dedicated local memory.

Each sequential debugger debugs only a program process of a relevant processor element. The sequential debugger performs a debugging process corresponding to a debug command that is received from the management processor. Examples of the debug command are "PRINT" command, "BREAK" command, "CONTINUE" command, "STEP" command, and "P.STAT" command.

In addition, the management processor outputs a debug command to each processor element. The sequential debugger of each processor element debugs the process program corresponding to each processor element. The management processor receives reply information from each processor element as a result of the debugging process for data of the relevant processor element.

Thus, the management processor outputs various debug commands to the sequential debuggers of the individual processor elements and receives reply information from the sequential debuggers. Consequently, the management processor can obtain the statuses of the programs of all the processor elements and effectively manage the debugging process. Thus, the management processor can effectively perform the debugging process.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 8 is a flow chart for explaining a debug command sending process performed by the management processor;

FIG. 15 is a schematic diagram for explaining a variable region of a shared memory;

FIG. 24 is a schematic diagram showing an example of a display in the case that output data of each sequential debugger is grouped.

DESCRIPTION OF PREFERRED EMBODIMENT

With reference to the accompanying drawings, an embodiment of the present invention will be described.

Figure 1:
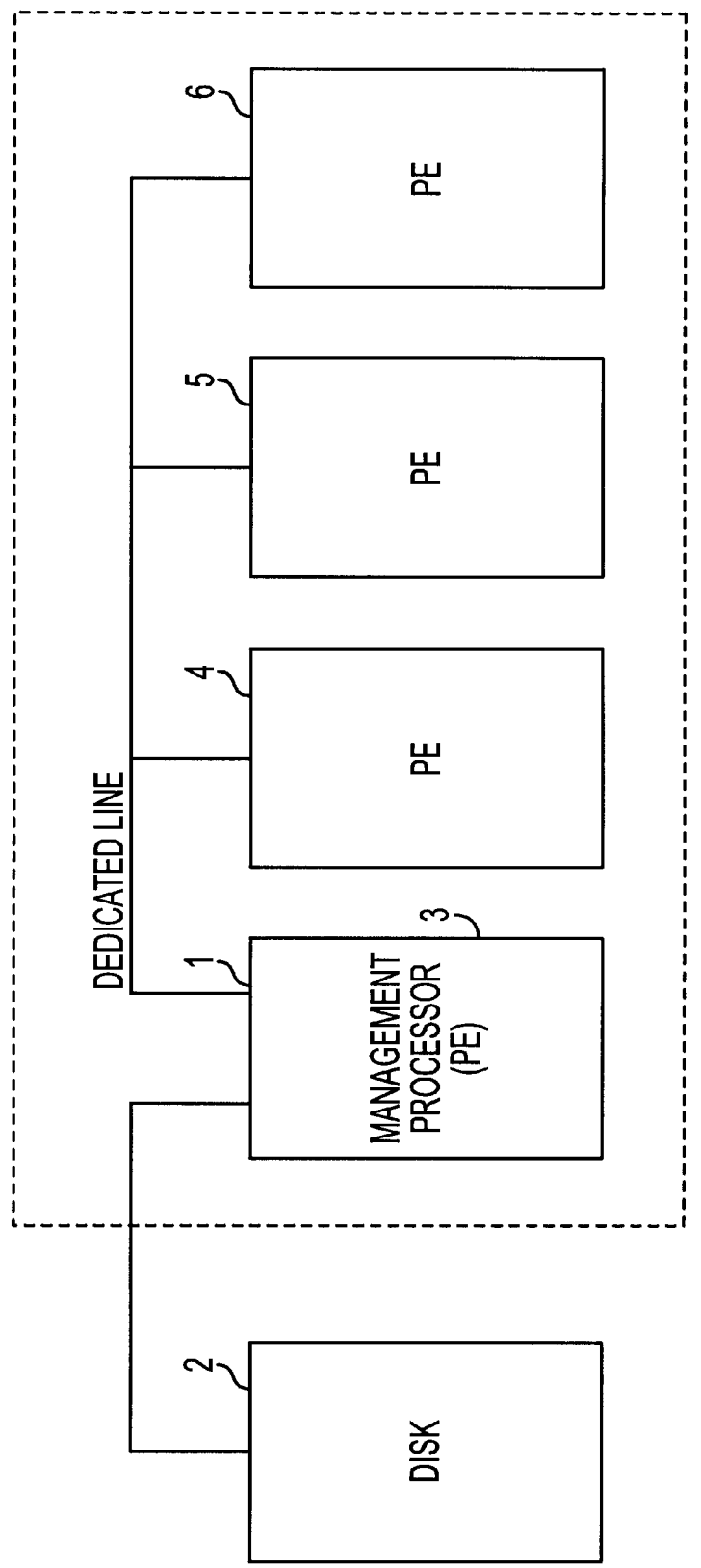
FIG. 1 is a schematic diagram showing the structure of the data parallel processing apparatus for which the debugging system according to the present invention is applied.

FIG. 1 is a block diagram showing a data parallel processing apparatus for which a debugging system according to the present invention is applied. A management processor 1 performs, for example, a scientific and engineering calculating process with a parallel program stored in a disc 2. Three processor elements 4 to 6 are connected to a management processor 1 through a dedicated line. The management processor 1, which is a server, also functions as one processor element (hereinafter sometimes referred to as PE) 3.

When a science and engineering calculation is performed in this system, the management processor 1 reads a calculation program from the disc 2. When the same calculating process is continuously performed, the management processor 1 divides the calculating process and assigns the divided process portions to the four processor elements 3 to 6. For example, when a calculation of A*B is performed 100 times, the calculation of A*B for 100 times is divided by four. The calculation of A*B for 25 times is assigned to each of the processor elements 3 to 6. Thus, each of the processor elements 3 to 6 stores 25 pieces of each of data A and B.

Figure 2:
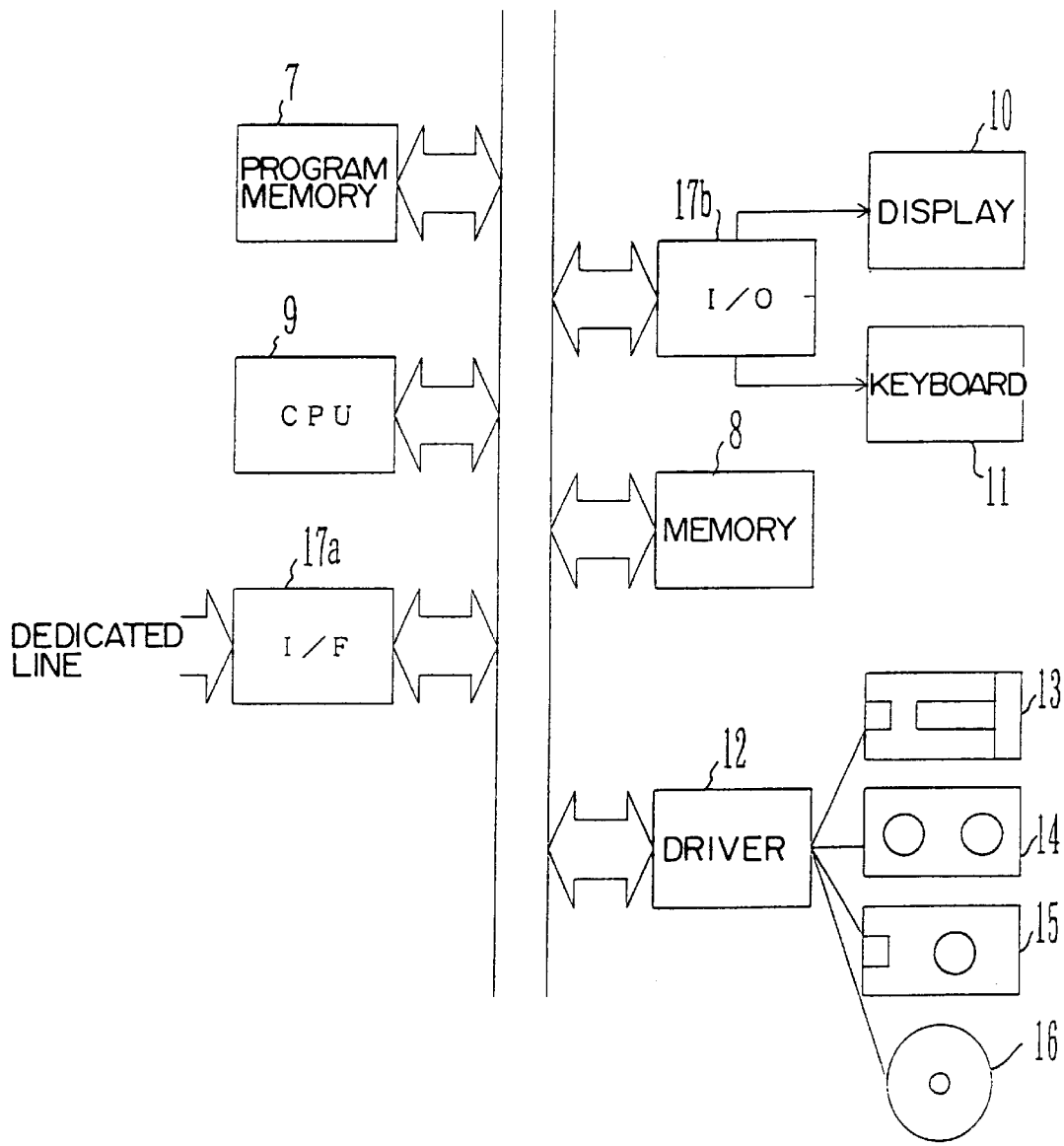
FIG. 2 is a schematic diagram for explaining a management processor.

FIG. 2 is a schematic diagram for explaining the structure of the above-described management processor 1. In FIG. 2, a CPU 9 is a central processing unit that controls the management processor 1. The CPU 9 performs a process corresponding to a program stored in a program memory 7. Reply information is supplied from a sequential debugger (that will be described later) through a communication interface (hereinafter referred to as I/F) 17a. The reply information is stored in a memory 8. In this system, a display 10 and a keyboard 11 are connected through an input/output interface (hereinafter referred to as I/O) 17b. When necessary, the reply information is displayed on the display 10. A command issued by the user is input from the keyboard 11. Display structure of the display 10 will be described later.

A driver 12 exchanges data with an external storing medium. For example, the driver 12 is connected to a magnetic disc 13, a magnetic tape 14, a floppy disk 15, and/or an optical disc 16. A storing medium connected to the driver 12 stores a program of the debugging system. When necessary, the program is read from the storing medium connected to the driver 12.

Figure 3:
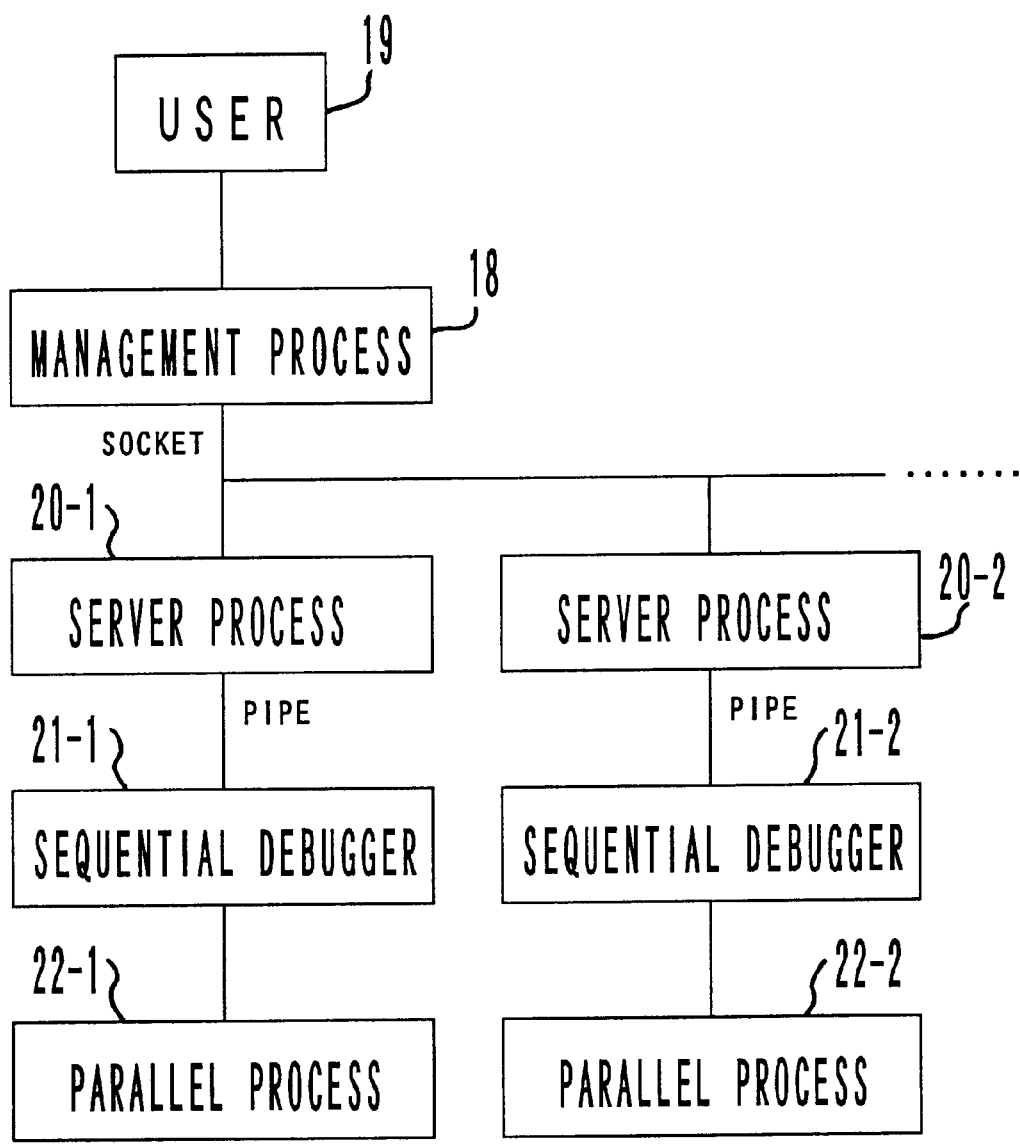
FIG. 3 is a block diagram showing the structure of a debugging system according to the present invention, the debugging system being applied for the data parallel processing apparatus.

FIG. 3 is a schematic diagram showing the structure of a debugging system according to the present invention. The illustrated debugging system is applied for a data parallel processing apparatus. In FIG. 3, a management process 18 is a debugging management program with which the management processor 1 interactively performs the debugging process.

In reality, the user 19 operates the keyboard 11 of the management processor 1 or buttons (that will be described later) of the display 10 and inputs various debug commands. The debug commands are for example "PRINT", "SET", "BREAK", and "P.STAT". The "PRINT" command is used to print designated data. The "SET" command is used to rewrite data. The "BREAK" command is used to designate a stop position of a source program. The "P.STAT" command is used to display a status. The management processor 1 outputs a designated debug command corresponding to a key operation signal or a button operation signal.

Server processes 20-1, 20-2, and so forth are programs that cause the system to supply various debug commands received from the management processor 1 to relevant sequential debuggers 21-1, 21-2, and so forth and to perform an exchanging process for various debug commands. In addition, the server processes 20-1, 20-2, and so forth cause the system to supply reply information received from the sequential debuggers 21-1, 21-2, and so forth to the management processor 1. The management process 18 communicates with the server processes 20-1, 20-2, and so forth in a socket communication basis. The server processes 20-1, 20-2, and so forth communicate with the sequential debuggers 21-1, 21-2, and so forth for various debug commands and reply information in a pipe communication basis.

The sequential debuggers 21-1, 21-2, and so forth cause the relevant server processes 20-1, 20-2, and so forth to analyze debug commands received from the management processor 1 and execute the debug commands. For example, when each sequential debugger receives the "PRINT" command as a debug command, the sequential debugger reads data from a designated region and outputs reply information to the management process 18. When each sequential debugger receives the "BREAK" command, the sequential debugger designates a stop pointer to a designated address of a source program.

The sequential debuggers 21-1, 21-2, and so forth designate parallel processes 22-1, 22-2, and so forth of the relevant processor elements 3 to 6 as debugging objects. The parallel processes are basically the same in the processor elements 3 to 6. Debugging objects of the sequential debuggers 21-1, 21-2, and so forth include data and variables of local memories and the shared memory that the parallel processes can access.

Figure 4:
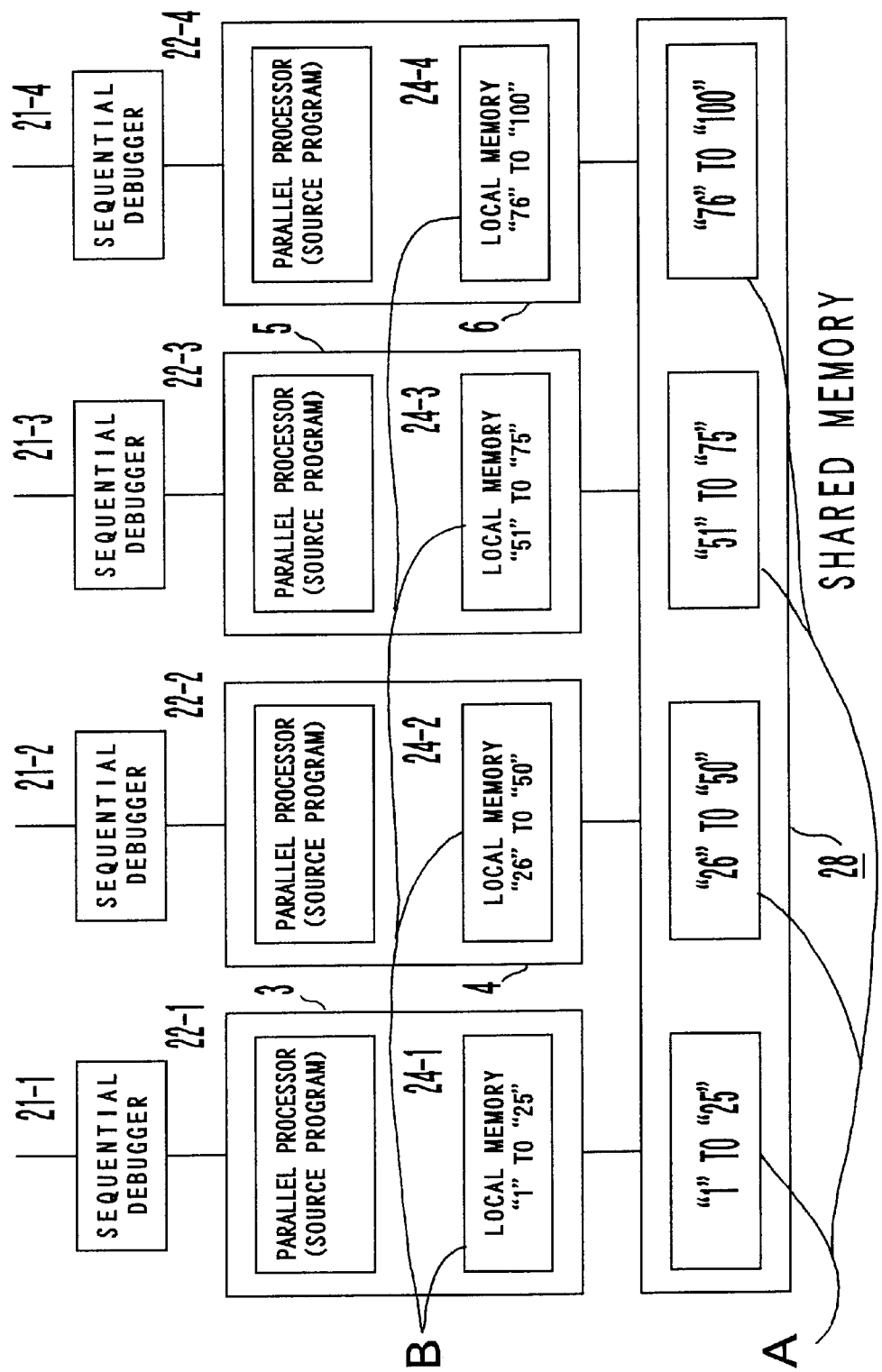
FIG. 4 is a schematic diagram showing the structure of processor elements including sequential debuggers and parallel processors.

FIG. 4 is a schematic diagram showing the structure of the processor elements 3 to 6, the structure including the sequential debuggers and the parallel processes. In FIG. 4, the processor element 3 has a local memory area 24-1. The processor element 3 performs a parallel process 22-1 with data stored in the local memory area 24-1. The processor element 4 has a local memory area 24-2. The processor element 4 performs a parallel process 22-2 with data stored in the local memory area 24-2. This structure also applies to the processor elements 5 and 6.

A shared memory 28 that the processor elements 3 to 6 share is illustrated. Any parallel processes 22-1 to 22-4 can read data from the shared memory 28.

Data and variables for the parallel processes 22-1 to 22-4 are written or read to/from the local memories 24-1 to 24-4. In this embodiment, the areas of the local memories 24-1 to 24-4 are denoted by "B". The local memories 24-1 to 24-4 are designated address numbers "1" to "25", "26" to "50", "51" to "75", and "76" to "100", respectively.

On the other hand, the shared memory 28 stores data and variables that cannot be stored in the local memories 24-1 to 24-4. Alternatively, the shared memory 28 stores data and variables shared by the local memories 24-1 to 24-4. In this embodiment, the area of the shared memory 28 is denoted by "A". In addition, the shared memory has a storing area for "100". The area for "100" is divided into four blocks "1" to "25", "26" to "50", "51" to "75", and "75" to "100" assigned to the processor elements 3 to 6, respectively.

Moreover, as a region of a local area, a memory area to which the processor elements 3 to 6 can be addressed in common may be provided. In this case, the individual areas have address numbers for example "1" to "100".

Figure 5:
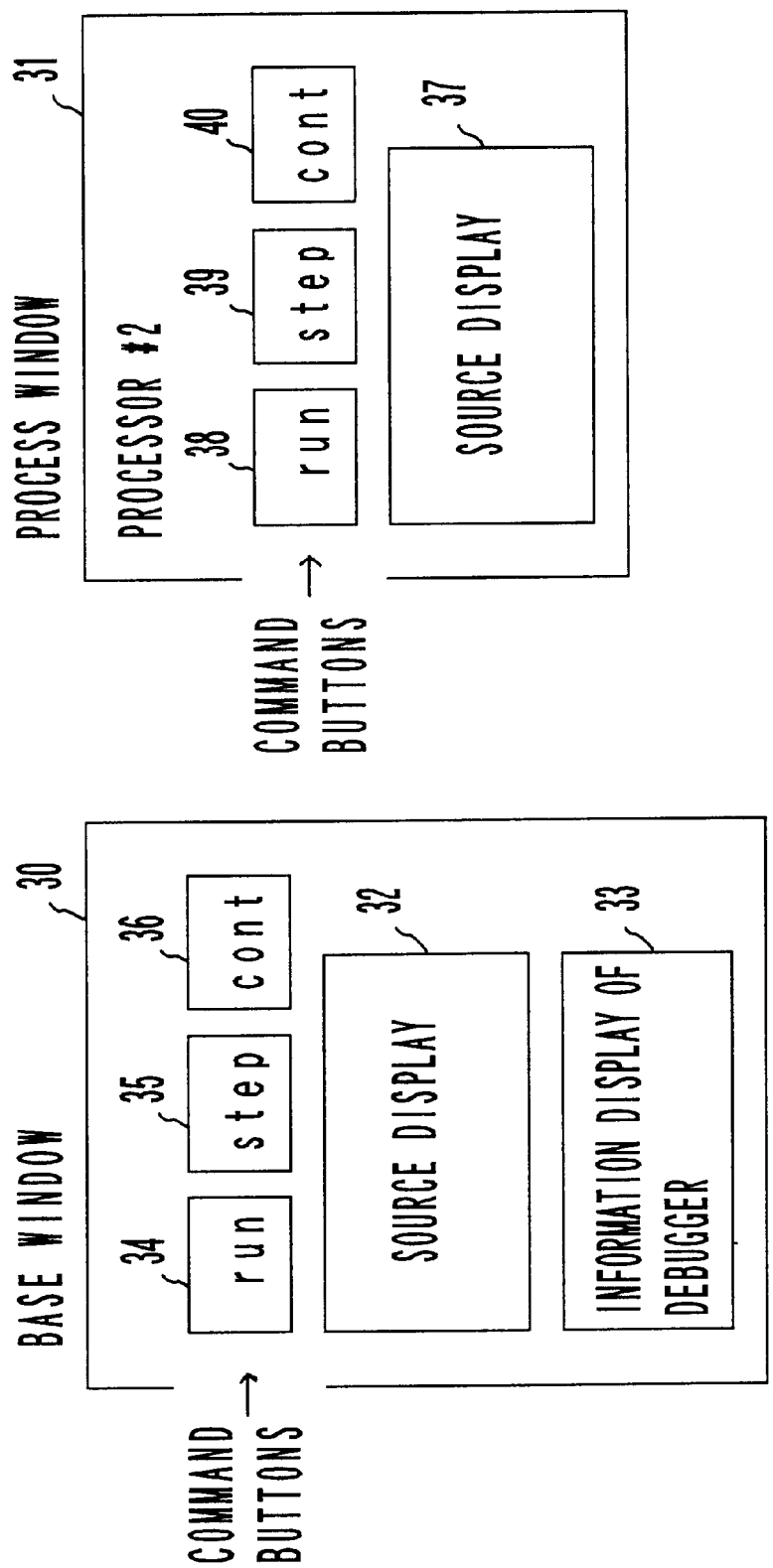
FIG. 5 is a schematic diagram showing display examples of windows displayed on a display of the management processor.

FIG. 5 is a schematic diagram showing display examples of windows displayed on the display 10 of the management processor 1. A base window 30 and a process window 31 are displayed on the display 10. The base window 30 is composed of a source display portion 32 and a debugger information display portion 33. In the source display portion 32, a source program (namely, the above-described parallel process) is displayed. In the information display portion 33, the result of a process corresponding to a debug command (that will be described later) is displayed as reply information along with output information.

Command buttons are used to designate relevant commands. For example, a "run" button 34 is used to start up a debug program. In this case, the "RUN" command is output from the management processor 1. A "step" button 35 is used to output the "STEP" command. A "continue" button 36 is used to output the "CONTINUE" command.

On the other hand, the process window 31 is composed of various buttons as with the source display portion 37. In the source display portion 37, a relevant source program (parallel program) is displayed. As with base window 30, the various buttons are a "run" button 38, a "step" button 39, and a "continue" button 40.

Figure 6:
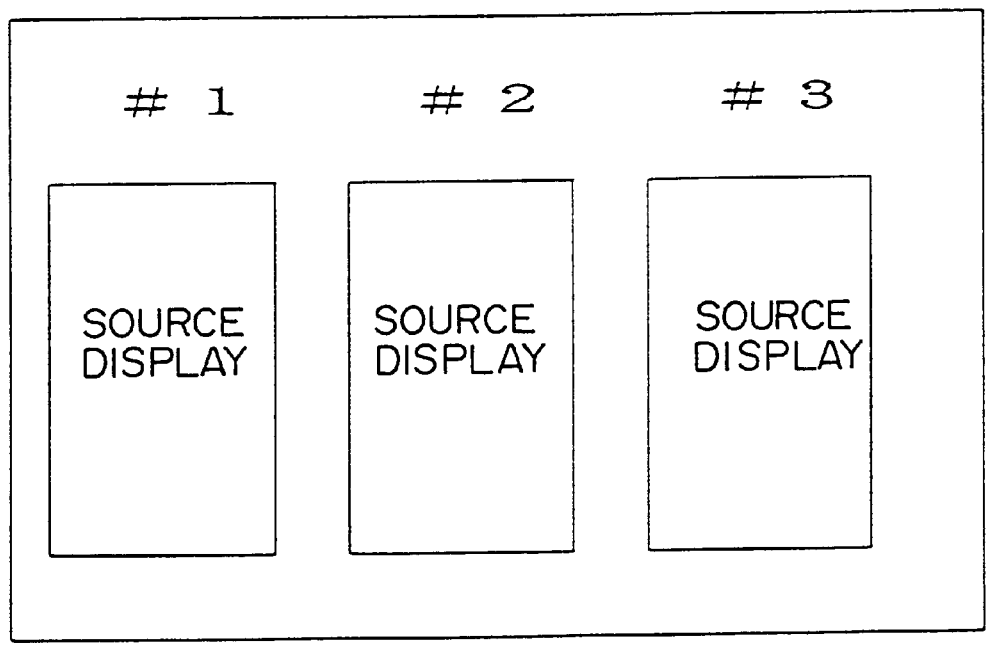
FIG. 6 is a schematic diagram showing a display structure in the case that only source programs are displayed on the display.

FIG. 6 is a schematic diagram showing an example of the display structure in the case that only source programs are displayed on the display 10 of the management processor 1. In this case, source programs of three processor elements are compared. The three source programs may be the same or different from each other.

A practical process of the debugging system of the data parallel processing apparatus will be described. FIGS. 7 to 12 are flow charts for explaining the process of the debugging system.

Figure 7:
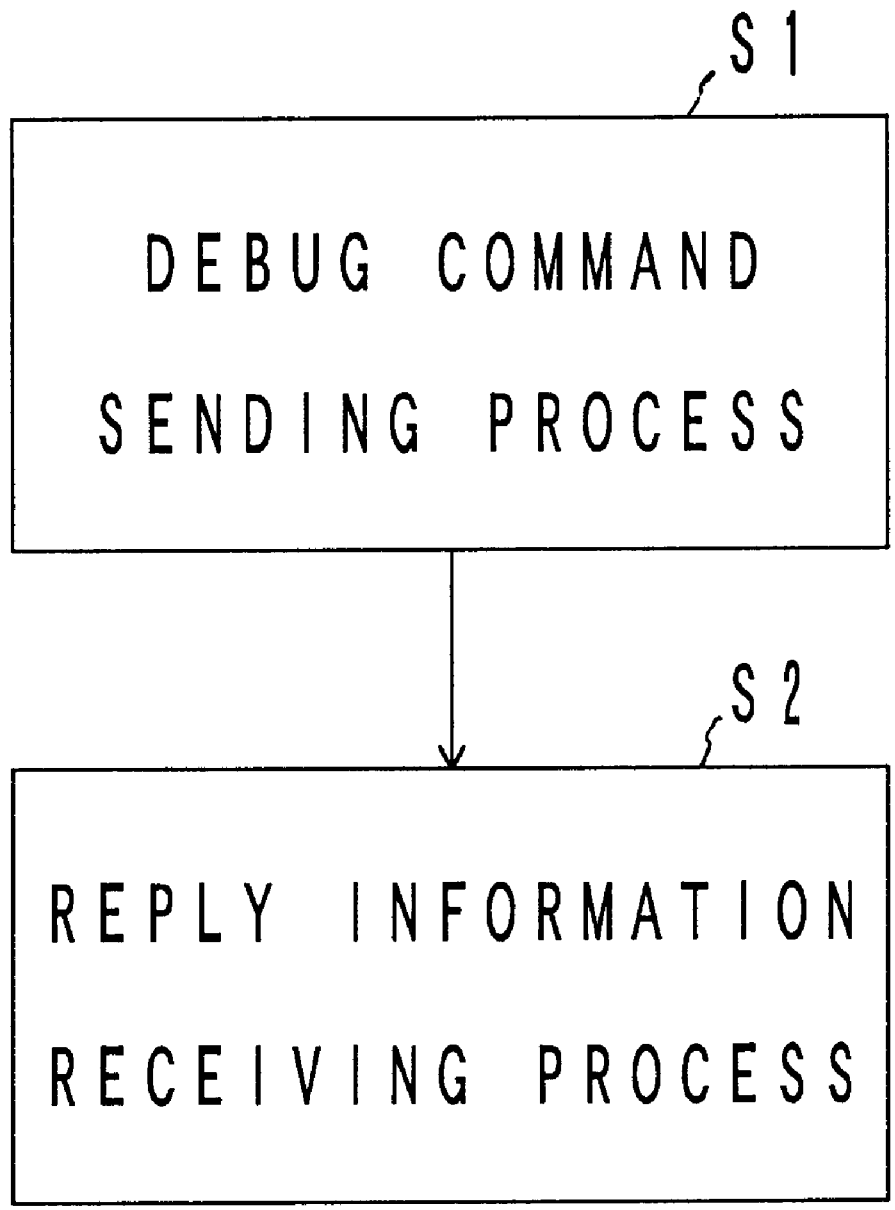
FIG. 7 is a flow chart showing a process of the management processor.

FIG. 7 shows a process performed in the management process 18 shown in FIG. 3. The management process 18 performs a debug command sending process (at step S1) and a reply information receiving process for the sequential debuggers 21-1 to 21-4 for the debug command (at step S2).

FIG. 8 is a flow chart for practically explaining the sending process. Next, with reference to FIG. 8, the debug command sending process for the management processor 1 will be described. In the following description, with real debug commands, the process and the operation of the embodiment will be described.

<"PRINT" Command>

First, the process in the case that the "PRINT" command is executed will be described.

The management processor 1 analyzes an input command (corresponding to a key operation signal) issued by the user (at step S1-1). As the analyzed result, in this example, the management processor 1 determines that the input command is the "PRINT" command.

Next, the management processor 1 determines whether or not a PE has been designated (at step S1-2). Namely, a sequential debugger to which the command is output has been designated. This designation is performed by the user with the keyboard 11. When a PE has not been designated, another process is performed. In this case, the management processor 1 has a table that represents addresses of the local memories 24-1 to 24-4 shown in FIG. 4. The management processor 1 automatically selects a PE that has higher priority for the "PRINT" command.

On the other hand, when a PE has been designated (namely, the determined result at step S1-2 is Yes), the management processor 1 determines whether or not all sequential debuggers or part thereof have been designated (at step S1-3). When all the sequential debuggers have been designated as the determined result at step S1-3, the management processor 1 adds for example a command "ALL" to the "PRINT" command. The management processor 1 outputs the resultant command to the all the sequential debuggers 21-1 to 21-4 (at steps S1-3 and S1-4). At this point, the command structure is for example (ALL "PRINT" B"100") where B"100" represents the address "100" of the local memory.

When a PE has been designated and only the sequential debugger 21-4 has been designated, a command "4:" that represents the sequential debugger 21-4 is added (at steps S1-3 and S1-5). In this case, the command structure is for example (4: "PRINT" B"100").

When all the sequential debuggers 21-1 to 21-4 have been designated, the management processor 1 outputs the debug command ("PRINT" command) to all the sequential debuggers 21-1 to 21-4 through the server processes 20-1 to 20-4, respectively. On the other hand, when only the sequential debugger 21-4 has been designated, the management processor 1 outputs the debug command to only the sequential debugger 21-4.

Figure 9:
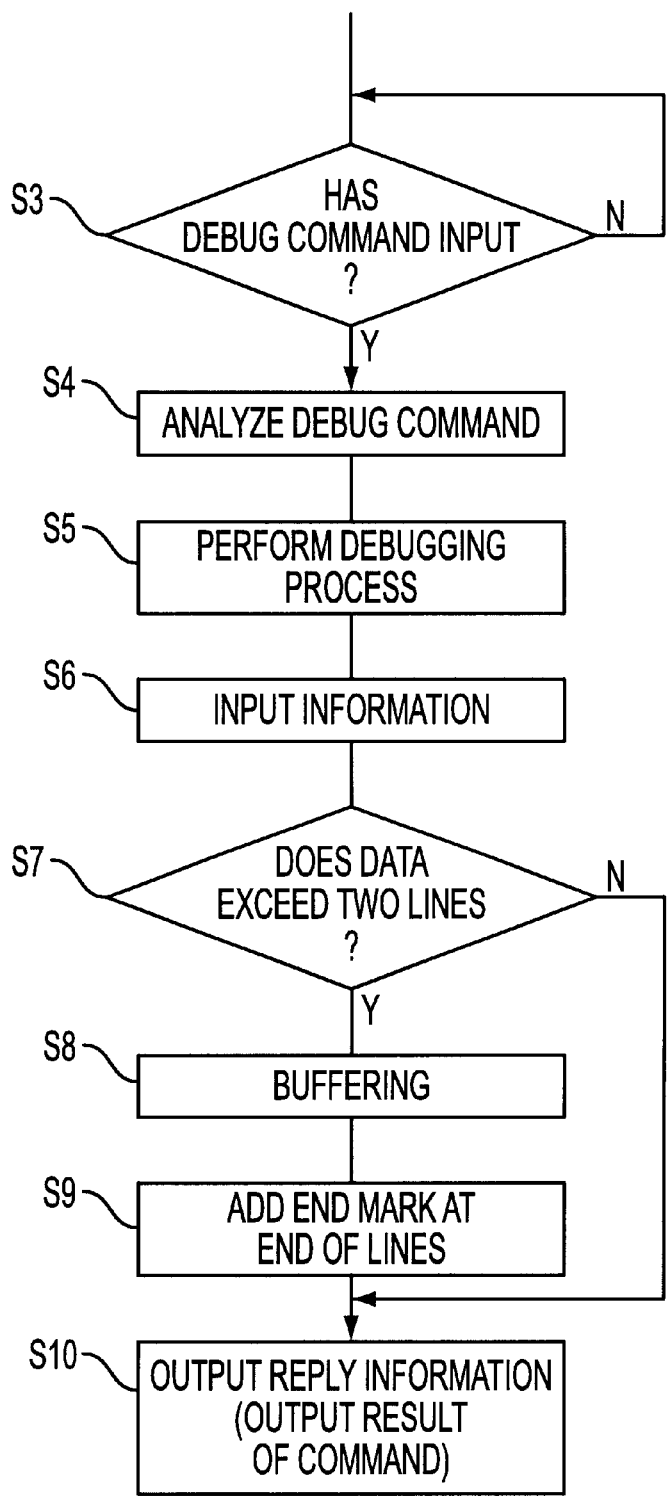
FIG. 9 is a flow chart for explaining a process performed by a sequential debugger.
Figure 10:
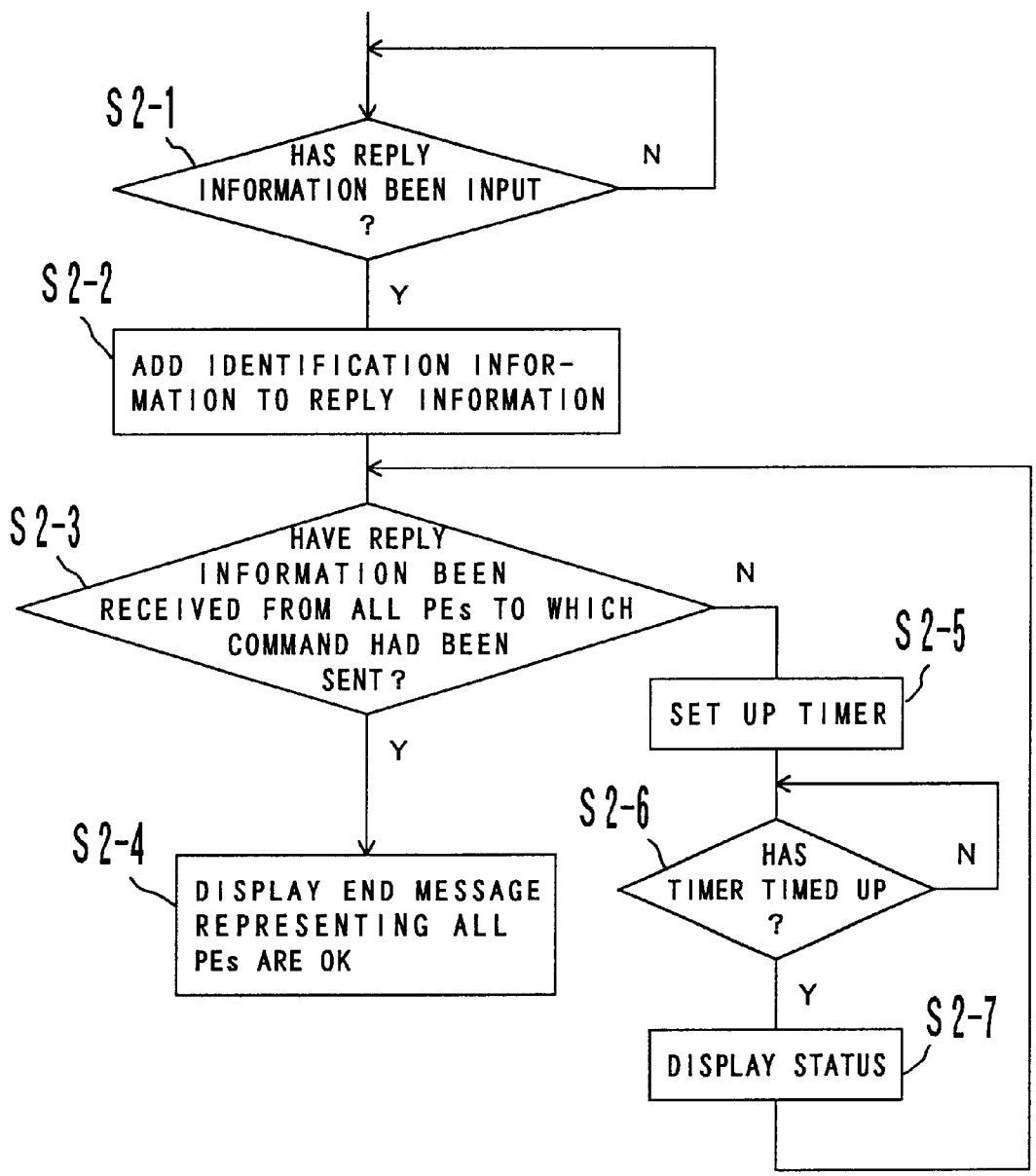
FIG. 10 is a flow chart for explaining a reply information receiving process performed by the management processor.

On the other hand, each sequential debugger that has received the "PRINT" command executes the designated debug command. FIG. 9 is a flow chart for explaining the process that each sequential debugger performs.

Each of the sequential debuggers 21-1 to 21-4 determines whether or not a debug command has been received (at step S3). When a debug command has not been received, each sequential debugger waits for a debug command. When a debug command has been received (namely, the determined result at step S3 is Yes), each sequential debugger analyzes the debug command (at step S4). In this example, since the debug command is the "PRINT" command, the sequential debugger determines that the debug command is the "PRINT" command (at step S4).

Next, each sequential debugger executes the analyzed command (at step S5). In this example, as described above, since the debug command is the "PRINT" command and data to be printed is data at address "100" of the local memory "B", each sequential debugger reads data from the address "100" of the local memory (B). As is clear from FIG. 4, the address "100" is present in the local memory of the processor element 6. Thus, only the sequential debugger 21-4 can read data from the local memory. Consequently, the sequential debugger 21-4 reads data from the address "100" of the local memory 22-4 (at step S6). In this case, although other sequential debuggers 21-1 to 21-3 designated by the "ALL" command perform the above-described debugging process (data print process of the local memory), since these sequential debuggers do not have the relevant address of the respective local memories, there is not information to read.

Thus, in this case, only the sequential debugger 21-4 reads data from the address "100" of the local memory. When the "4:" command has been designated and thereby only the sequential debugger 21-4 performs the above-described process, the other sequential debuggers do not perform the above-described process.

Thereafter, the sequential debugger 21-4 determines whether or not data exceeding two lines has been input (at step S7). In this example, since data is read from the address "100" of the local memory 22-4, input data does not exceed two lines (namely, the determined result at step S7 is No). However, when the "PRINT" command represents a particular range of data, the input data may exceed two lines (in this case, the determined result at step S7 is Yes). For example, the sequential debugger 21-4 reads data at addresses "76" to "100" from the local memory 24-4.

In this case, the sequential debugger 21-4 stores data successively read from the local memory 24-4 in a buffer (not shown) (namely, the determined result at step S7 is Yes and the flow advances to step S8). After all data has been stored in the buffer, the sequential debugger 21-4 adds an end mark to the end of the data (at step S9).

Thereafter, the sequential debugger 21-4 outputs data exceeding two lines with the end mark or data composed of one line as reply information to the management processor 1 (at step S10).

On the other hand, the management processor 1 that has output the debug command ("PRINT" command) waits for a reply from each sequential debugger (at step S2-1 (FIG. 10)). When the management processor 1 has received reply information from each sequential debugger (namely, the determined result at step S2-1 is Yes), the management processor 1 adds identification information to the reply information (at step S2-2). In this example, the identification information (identification label) represents that reply information has been received from the sequential debugger 21-4.

Figure 13A:
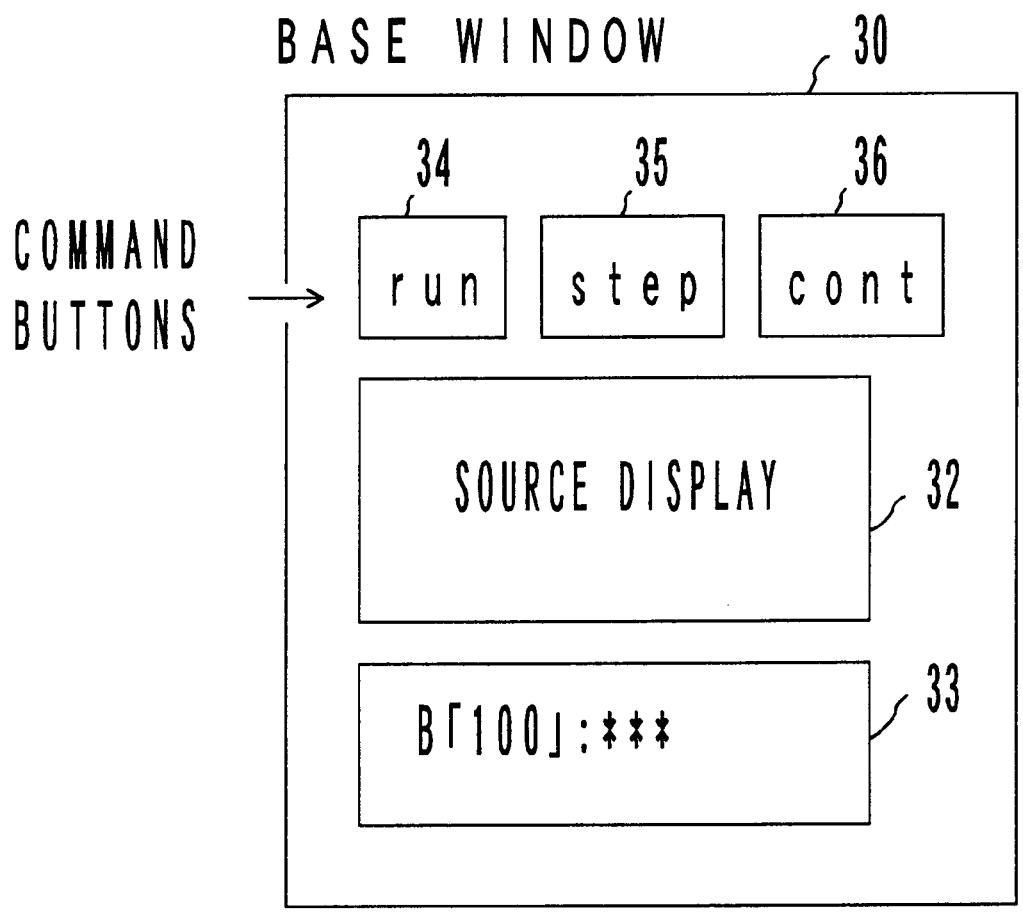
FIGS. 13A and 13B are schematic diagrams showing data in a status display portion after a "PRINT" command is output.

Next, the management processor 1 determines whether or not reply information has been received from all PEs to which the command has been sent (at step S2-3). When reply information has been received from all the PEs (namely, the determined result at step S2-3 is Yes), the management processor 1 displays an end message (at step S2-4). For example, in this case, the management processor 1 displays a message (B"100": *) as the end message as shown in FIG. 13A. In other words, the management processor 1 displays data * at the address "100" of the local memory in the information display portion 33. At this point, data displayed in the source display portion 32 does not vary.

Figure 13B:
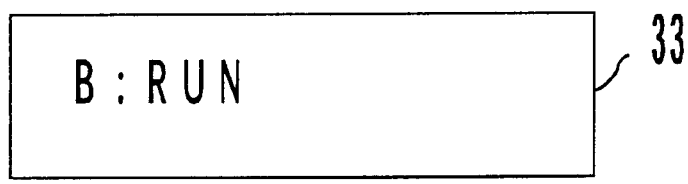

On the other hand, when the management processor 1 has not received reply information from all the PEs (namely, the determined result at step S2-3 is No), the management processor 1 sets up a timer (at step S2-5). When the management processor 1 has not received reply information until the timer has timed up (namely, the determined result at step S2-6 is Yes), management processor 1 displays a status (at step S2-7). FIG. 13B shows an example of a status such as "B: RUN". In FIG. 13B, a status is displayed in only the information display portion 33.

In the above-described example, the "PRINT" command was issued for data at the address "100" of the local memory (B). However, the "PRINT" command for data stored in the shared memory 28 is processed in the following manner.

Figure 11:
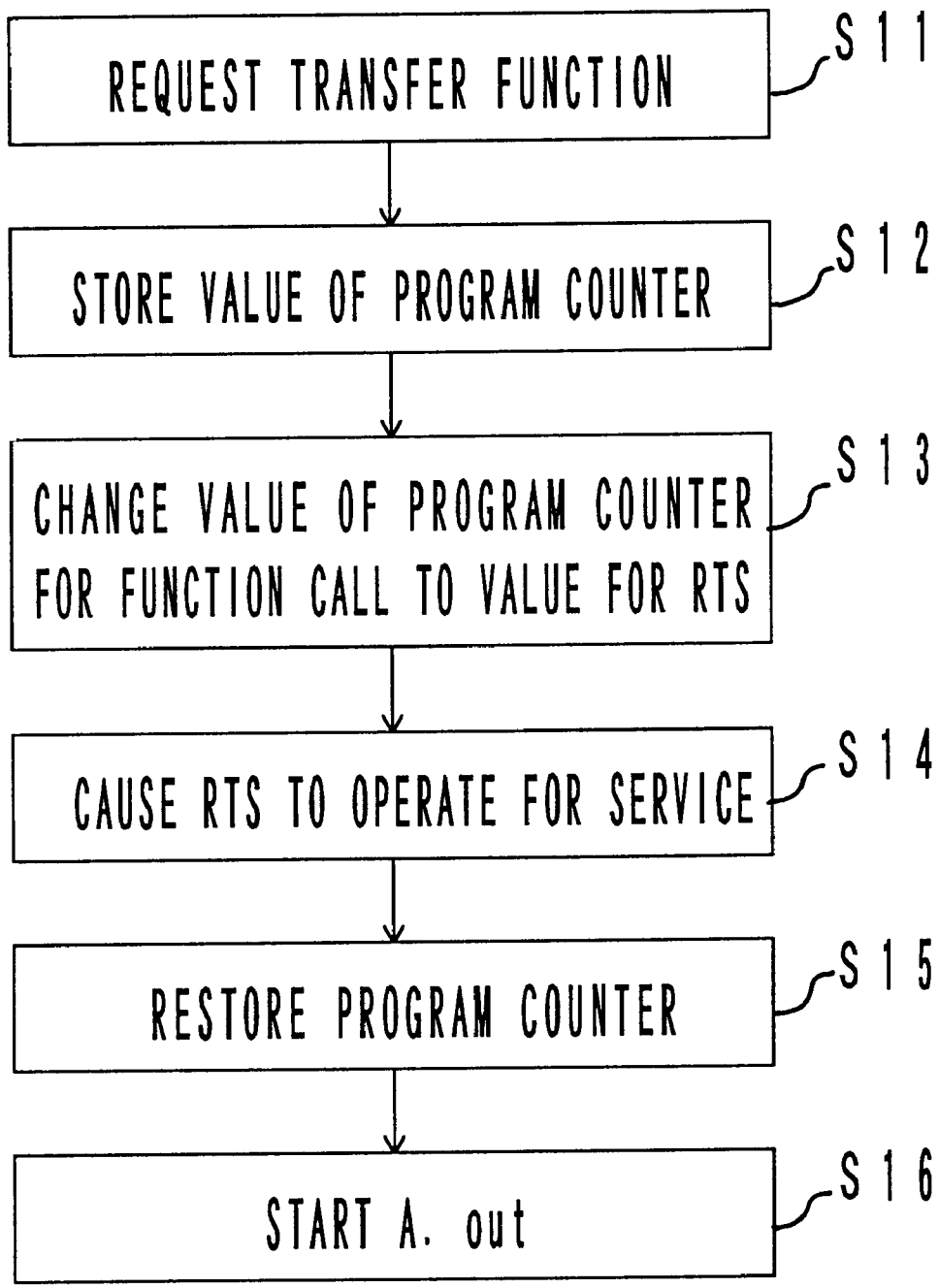
FIG. 11 is a flow chart showing a transmission function processing program.

FIG. 11 is a flow chart showing a process program at this point. For example, the "PRINT" command for a variable stored in the shared memory 28 is input.

Figure 14:
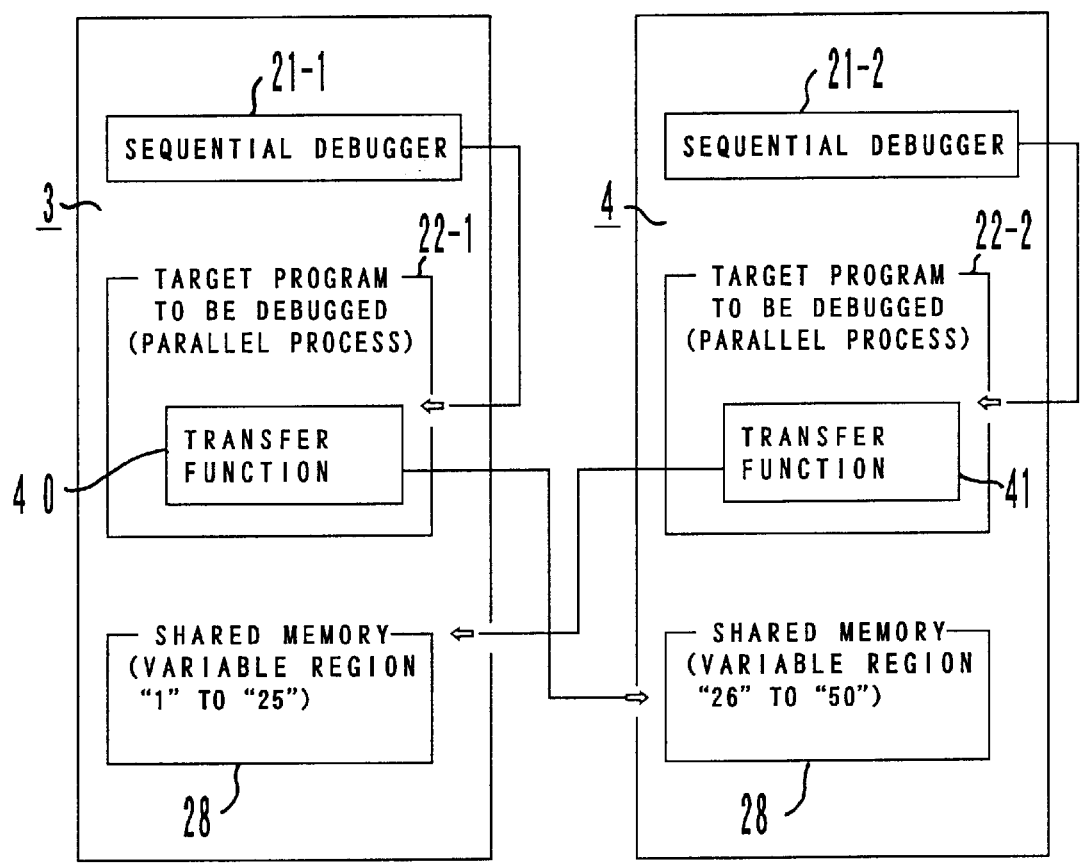
FIG. 14 is a schematic diagram for explaining the transmission function process.
Figure 15:
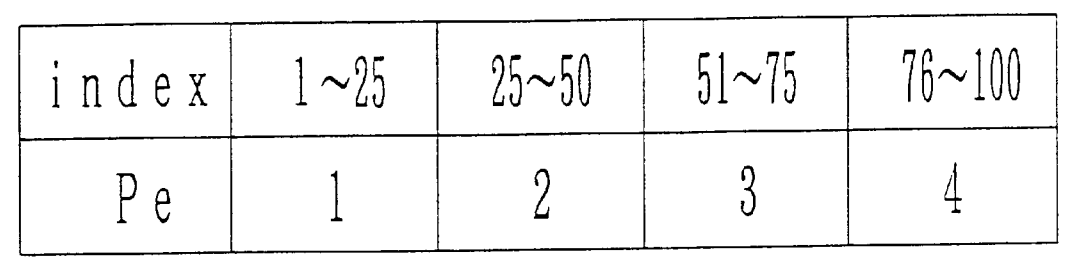

As shown in FIG. 14, it is assumed that when necessary, a transfer function is described in a target program to be debugged (parallel process). In the example shown in FIG. 14, a transfer function 40 is described in a parallel process 22-1. The transfer function 40 is a function for linking an object to a variable region of the shared memory 28 of the processor element 4. As described above, all the sequential debuggers 21-1 to 21-4 can obtain the address of the variable region of the shared memory 28. FIG. 15 shows a table with which the sequential debuggers 21-1 to 21-4 can obtain the address of the variable region of the shared memory 28. With reference to the table of the variable region shown in FIG. 15, the sequential debuggers 21-1 to 21-4 can access the shared memory 28.

Thus, when a particular variable of the shared memory 28 is designated (namely, a particular address is designated), a relevant sequential debugger requests the transfer function (at step S11 of FIG. 11). Thus, the relevant sequential debugger (for example, the sequential debugger 21-1) stores the value of a program counter of the parallel process (source program) 22-1 (at step S12). For example, when the program counter of the parallel process 22-1 stops at a particular break position, the sequential debugger 21-1 stores data at this position.

Next, to read the relevant transfer function 40, the sequential debugger 21-1 changes the value of the program counter to a value for RTS (Run Time System)(at step S13). In addition, the sequential debugger 21-1 causes the RTS to perform a relevant service (at step S14). In this example, the sequential debugger 21-1 accesses a variable region (for example, "50") of the shared memory and reads data therefrom. The sequential debugger 21-1 outputs the resultant data as the above-described reply information to the management processor 1.

Thereafter, the sequential debugger 1 restores the program counter to the original address (at step S15) and executes the parallel process 22-1 (at step S16).

Figure 16:
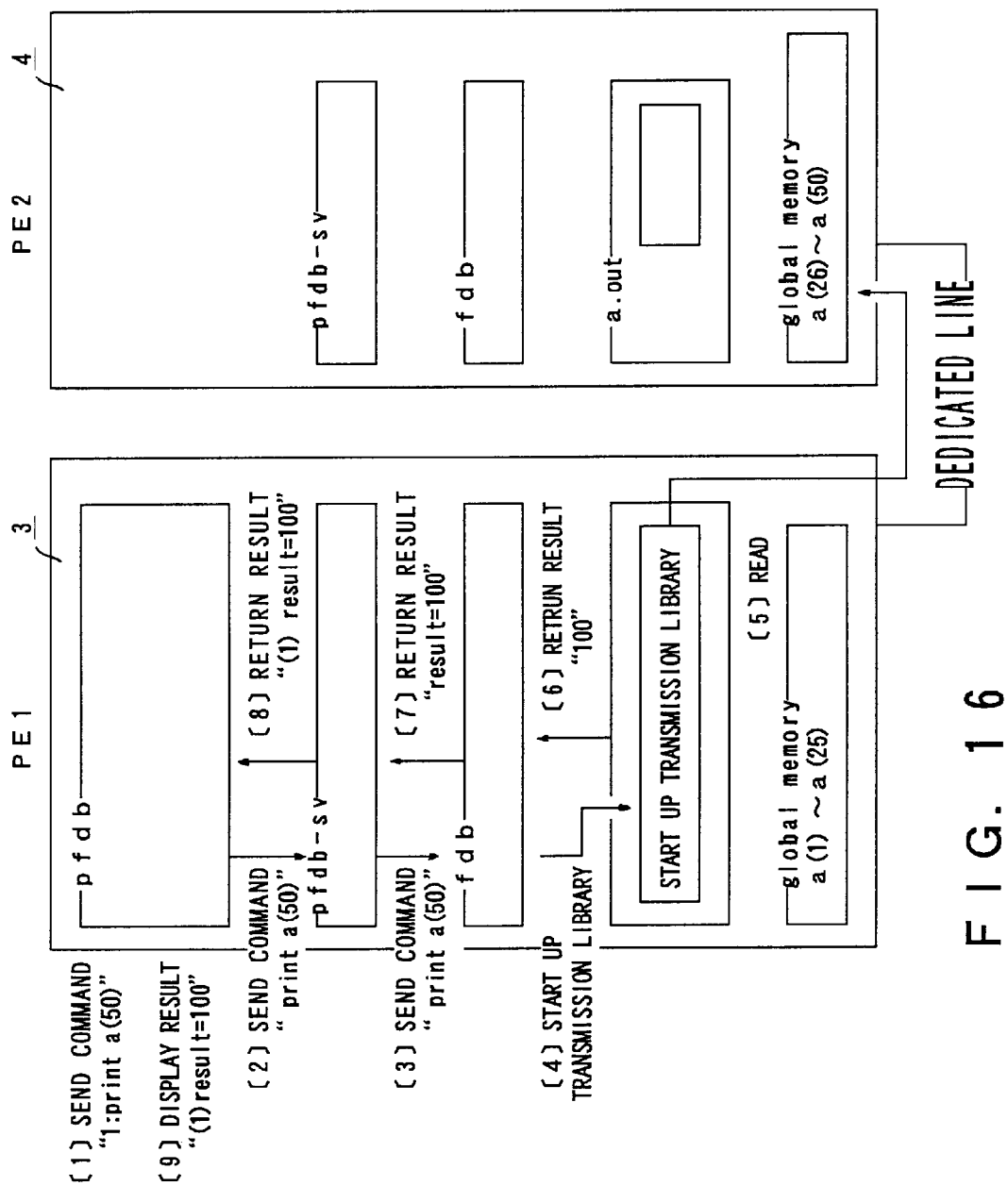
FIG. 16 is a schematic diagram for explaining a data flow including the case that the transmission function is used.

FIG. 16 is a schematic diagram for explaining a flow of a process in the case that the "PRINT" command is input along with the above-described transmission requesting process. In FIG. 16, [1] to [9] are steps of the process. [1] The "PRINT" command is sent. The management processor 1 of the PE1 receives the "PRINT" command. An object of the print request is a variable (address) 50 of the shared memory (A) (1: print a(50)). [2] The management processor 1 sends the command to the server processor 20-1 of the PE1. [3] The management processor 1 sends the command to the sequential debugger 21-1. Since the address 50 of the shared memory 28 is not present in the PE1, [4] the management processor 1 starts up the transfer function (library) and [5] reads data at the address of the shared memory 28 of another processor element PE2. [6] The management processor 1 outputs data that has been read (for example, data 100) as reply information to the sequential debugger 21-1. [7] The reply information is sent to the server processor 20-1. [8] The reply information is output to the management processor 1. [9] The result is displayed in the output information display portion 33. At this point, for example "(1) result= 100" is displayed.

In the above-described process, with the transfer function 40 designated in the parallel process 22-1, the function region of the shared memory 28 in another processor element is accessed. However, as shown in FIG. 16, with the transfer function 41 designated in the parallel process 22-2, the function region of the shared memory 28 in another processor element may be accessed.

Figure 12:
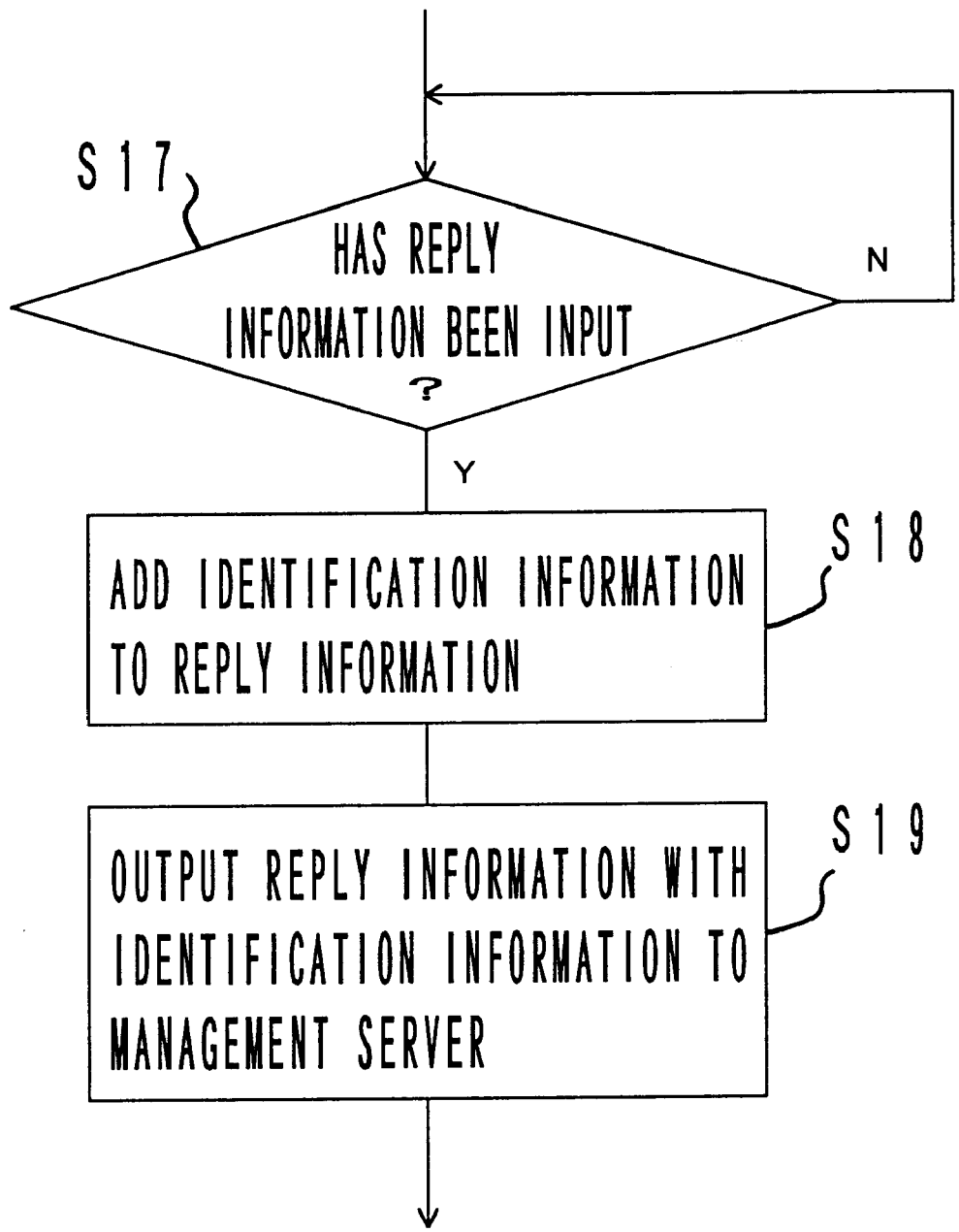
FIG. 12 is a flow chart for explaining addition of identification information performed by a server processor.

In the above-described example, the management processor 1 designates identification information (identification label). However, the server processors 20-1 to 20-4 may designate identification information. FIG. 12 is a flow chart for explaining this process.

In other words, when each server processor receives reply information from a relevant sequential debugger (namely, the determined result at step S17 is Yes), the server processor adds identification information to the input reply information (at step S18) and outputs the reply information with the identification information to the management processor 1 (at step S19). Thus, the load applied to the management processor 1 can be alleviated.

<"SET" Command>

Next, the process in the case that the "SET" command is executed will be described.

The "SET" command is used to change data written to the local memory 24-1 to 24-4 or the shared memory 28. Thus, in this case, to confirm data to be changed, an address at which the data has been written in the local memory 24-1 to 24-4 or the shared memory 28 should be designated. In addition, the data should be displayed on the display 10 of the management processor 1. In this case, it is assumed that the displaying process has been executed with the "PRINT" command.

Thus, when the user confirms the display and changes the data being displayed, he or she issues the "SET" command. The "SET" command is a debug command used to change data. As with the "PRINT" command, the "SET" command is output corresponding to the flow chart shown in FIG. 8. In other words, the management processor 1 analyzes an input command (corresponding to a key operation signal) that has been input by the user (at step S1-1). As the analyzed result, in this case, the management processor 1 determines that the input command is "SET" command.

Next, the management processor 1 determines whether or not a PE has been designated (at step S1-2). When a PE has not been designated, the management processor 1 automatically designate a PE with reference to for example a table. When a PE has been designated, (namely, the determined result at step S1-2 is Yes), the management processor 1 determines whether or not all or part of the sequential debuggers have been designated (at step S1-3). When all the sequential debuggers have been designated as the determined result at step S1-3, the management processor 1 adds a command "ALL" and outputs the "SET" command with the command "ALL" to all the sequential debuggers 21-1 to 21-4 (at step S1-4). At this point, the command structure is for example (ALL "SET" B"100" TO8) where (B"100" TO8") represents that the address of the local memory "B" is changed to 8.

When only the sequential debugger 21-4 has been designated as the determined result at step S1-3, the "SET" command is output to only the sequential debugger 21-4. In this case, the command structure is for example (4: "SET" B"100" TO8).

When all the parallel processes 5a to 5d have been designated, the "SET" command is output to all the sequential debuggers 21-1 to 21-4. In contrast, when part of sequential debuggers is designated, the "SET" command is output to only the relevant sequential debugger.

On the other hand, each sequential debugger that has received the "SET" command executes the designated debug command corresponding to the "SET" command. The process in this example is performed corresponding to the flow chart shown in FIG. 9.

In other words, each of the sequential debuggers 21-1 to 21-4 determines whether or not a debug command has been input (at step S3). When a debug command has been input (namely, the determined result at step ST1 is Yes), each sequential debugger analyzes the input debug command (at step S4). In this example, since the "SET" command has been input as a debug command, each sequential debugger determines that the "SET" command has been input as the analyzed result (at step S4).

Next, each sequential debugger executes the analyzed command (at step S5). In this example, since the "SET" command has been input, each sequential debugger changes data of a designated memory. For example, data at the address "100" of the local memory "B" is changed to 8.

After each sequential debugger has completed the data changing process, the sequential debugger receives process end data (at step S6). In addition, each sequential debugger determines whether or not the process end data exceeds two lines (at step S7). When each sequential debugger processes the "SET" command, only process end data is input. Thus, since the input data does not exceed two lines, the determined result at step ST5 is No. Thus, each sequential debugger outputs reply information (at step S10).

The management processor 1 that has output the "SET" command waits for reply information from each sequential debugger (at step S2-1 (FIG. 10)). When the management processor 1 has received the reply information from each sequential debugger (namely, the determined result at step S2-1 is yes), the management processor 1 adds identification information to the reply information (at step S2-2). For example, the reply information that is output from each sequential debugger is character code that represents that "DATA CHANGE HAS BEEN COMPLETED".

Figure 17:
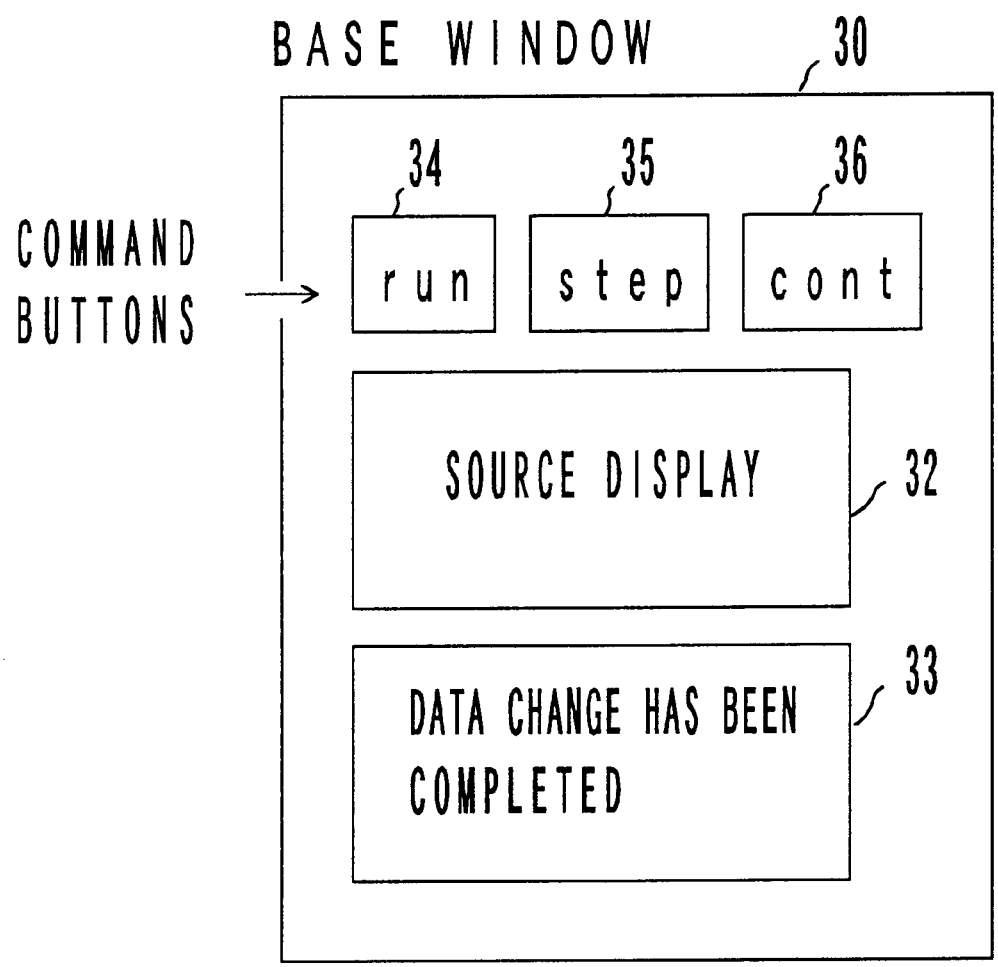
FIG. 17 is a schematic diagram showing data displayed in the status display portion after a "SET" command is output.

Next, the management processor 1 adds identification information (identification label) to the reply information received from each sequential debugger (at step S2-2) and determines whether or not reply information has been received from all PEs to which the command had been output (at step S2-3). When reply information has been received from all PEs (namely, the determined result at step S2-3 is Yes), the management processor 1 displays an end message (at step S2-4). For example, the end message is "DATA CHANGE HAS BEEN COMPLETED". The management processor 1 displays the end message in the status display portion as shown in FIG. 17.

When the management processor 1 has not received reply information from all the PEs, the management processor 1 sets up a timer. When the management processor 1 has not received reply information until the timer has timed up, the management processor 1 displays a status as with the "PRINT" command.

When a transmission function is described in an object program to be debugged (parallel process) and a data change command is present in a variable region of the shared memory 28, as with the "PRINT" command, the management processor 1 changes data in a designated variable region corresponding to the process shown in FIG. 11.

Alternatively, identification information (identification label) may be designated by the server processors 20-1 to 20-4 instead of the management processor 1. In this case, the process is performed corresponding to a flow chart shown in FIG. 12.

Thus, since the "SET" command is processed in the above-described manner, with the "SET" command that is output one time from the management processor 1, the command can be output and processed without considering the sequential debuggers 21-1 to 21-4.

Thus, the operation performed by the user can be alleviated.

When data is compared between memories, with the "PRINT" command, the data to be compared can be displayed and checked out. Alternatively, a dedicated command may be provided.

<"BREAK" Command>

Next, the process in the case that the "BREAK" command is executed will be described. As with the above-described debug commands, the "BREAK" command is processed corresponding to the above-described flow charts.

As with the above-described "PRINT" command, the management processor 1 analyzes an input command (corresponding to a key operation signal) that has been input by the user (at step S1-1). Thus, the management processor 1 determines that the input command is the "BREAK" command.

Next, the management processor 1 determines whether or not a PE has been designated (at step S1-2). When a PE has not been designated, the management processor 1 executes the above-described process. When a PE has been designated (namely, the determined result at step S1-2 is Yes), the management processor 1 determines whether the "BREAK" command is output to all the sequential debuggers or part thereof (at step S1-3). When all the sequential debuggers have been designated, the management processor 1 outputs the "BREAK" command to all the sequential debuggers 21-1 to 21-4 (at step S1-4). On the other hand, when part of the sequential debuggers has been designated, the management processor 1 outputs the "BREAK"command to only the designated sequential debugger. When all the sequential debuggers have been designated, the command structure is for example (ALL "BREAK" 50). When part of the sequential debuggers (for example, the fourth sequential debugger) has been designated, the command structure is for example (4: "BREAK" 50) where 50 represents that a break point is designated at address 50 of a source program.

Thus, the management processor 1 outputs the "BREAK" command to all the sequential debuggers 21-1 to 21-4 or part thereof.

Each sequential debugger that has received the "BREAK" command executes the "BREAK" command as a debug command. This process is performed corresponding to the flow chart shown in FIG. 9. Each sequential debugger determines whether or not a debug command has been input (at step S3). Thereafter, each sequential debugger analyzes the input debug command (at step S4) and determines that the input debug command is the "BREAK" command.

Next, each sequential debugger executes the analyzed command (at step S5). In the above-described example, a relevant sequential debugger designates a break point at address 50 of a source program. The break point designating process is performed by all sequential debuggers that have received the "BREAK" command. Thus, when all the sequential debuggers have been designated with the "ALL" command, the break point designating process is performed for all of the parallel processes 22-1 to 22-4. When only the parallel process 22-4 has been designated, the break point designating process is performed for only the parallel process 22-4.

Each sequential debugger that has performed the above-described break point designating process receives process end data (at step S6). Thereafter, each sequential debugger determines whether or not the end data exceeds two lines (at step S7). When the "BREAK" command is processed, since only end data is input, the data does not exceed two lines. Thus, since the determined result at step S7 is No, the relevant sequential debugger outputs reply information (at step S10).

On the other hand, the management processor 1 that has output the debug command ("PRINT" command) waits for reply information from each sequential debugger (at step S2-1 (FIG. 7)). When the management processor 1 has received reply information from each sequential debugger (namely, the determined result at step S2-1 is Yes), the management processor 1 adds identification information to the reply information (at step S2-2).

Figure 18:
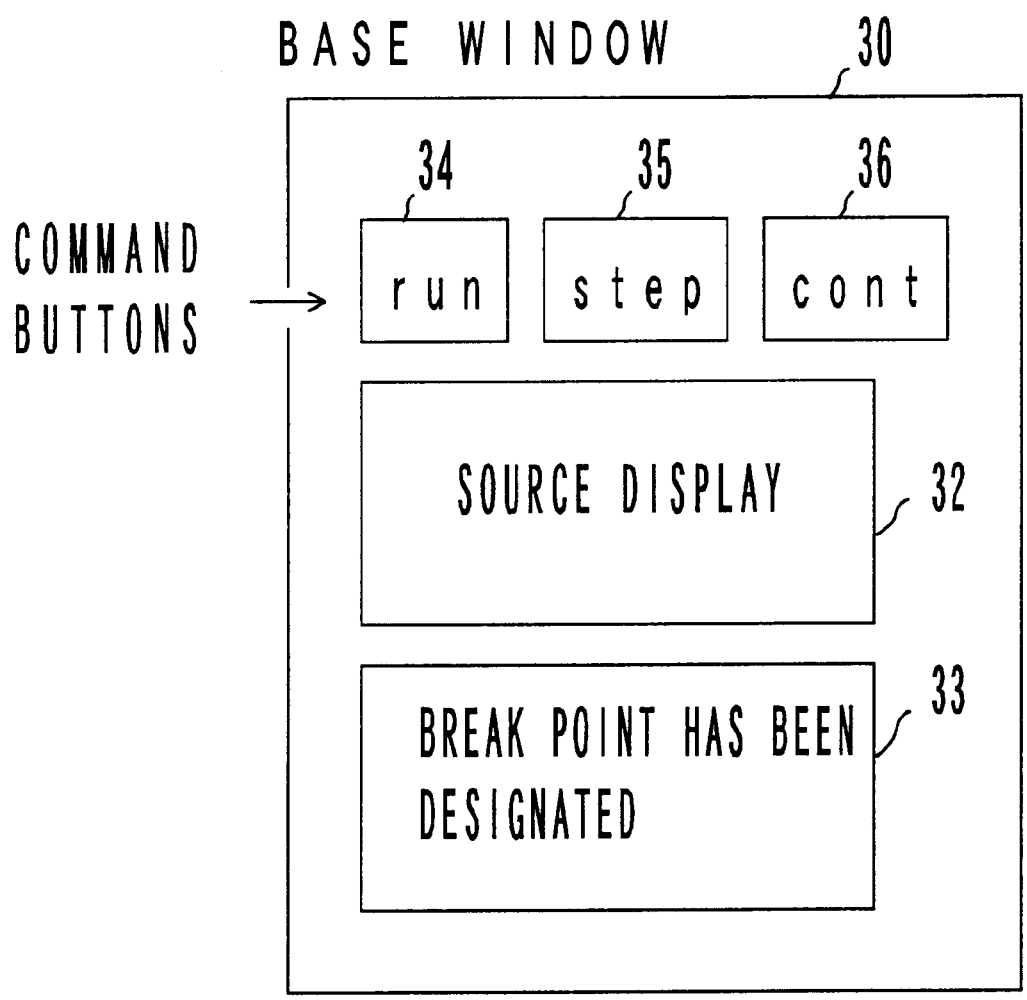
FIG. 18 is a schematic diagram showing data displayed in the status display portion after a "BREAK" command is output.

Next, the management processor 1 determines whether or not reply information has been received from all PEs to which the debug command has been output (at step S2-3). When the management processor 1 has received reply information from all the PEs (namely, the determined result at step S2-3 is Yes), the management processor 1 displays end data (at step S2-4). For example, the end data is a message that represents "BREAK POINT HAS BEEN DESIGNATED" as shown in FIG. 18.

Since the "BREAK" command is processed as described above, with the "BREAK" command that is output one time from the management processor 1, break points can be designated to all source programs. Thus, the process can be very effectively performed.

When a break point is designated, the content of the source display portion 32 on the display 10 is changed. The relevant source program is advanced to the break point and displayed. Thus, the user can check out the position of a break point of the source program.

<"CONTINUE" Command>

Next, the process in the case that the "CONTINUE" command is executed will be described.

The "CONTINUE" command is used to display a source program up to an address at which a break point has been designated with the above-described "BREAK" command. Thus, a break point is designated with the "BREAK" command in the above-described manner. In this example, it is supposed that an address "50" has been designated as a break point.

Next, the management processor 1 outputs the "CONTINUE" command. The "CONTINUE" command is also executed corresponding to the flow chart shown in FIG. 8. For simplicity, the description of the flow chart shown in FIG. 8 is omitted. As an analyzed result of an input command, the management processor 1 determine that the input debug command is the "CONTINUE" command. Depending on whether or not a PE has been designated, the management processor 1 outputs the "CONTINUE" command to all sequential debuggers or part thereof. Thus, the management processor 1 outputs the "CONTINUE" command to the designated sequential debugger or all the sequential debuggers. Each sequential debugger that has received the "CONTINUE" command executes the "CONTINUE" command.

Figure 19:
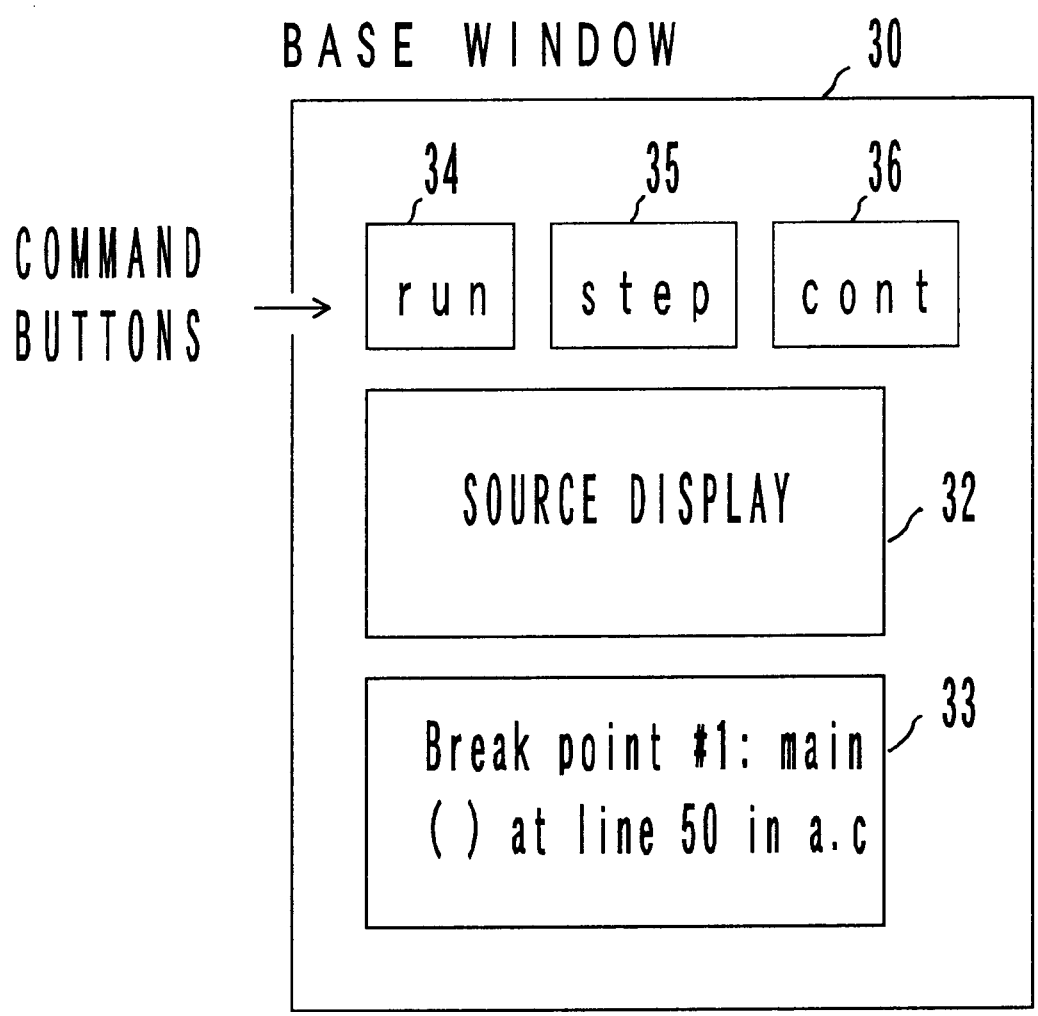
FIG. 19 is a schematic diagram showing data displayed in the status display portion after a "CONTINUE" command is output.

Next, each relevant sequential debugger executes the analyzed command and advances the source program to the address 50. In this case, in the next data inputting process (at step S6), since data that does not exceed two lines is not output, the determined result at step ST5 is No. Thus, each sequential debugger outputs reply information to the management processor 1 (at step S10). On the other hand, the management processor 1 that has output the "CONTINUE" command waits for reply information from each sequential debugger. When the management processor 1 has received reply information, it adds identification information to the reply information and determines whether or not it has received reply information from all PEs to which the debug command has been sent. When the management processor 1 has received reply information from all the PEs, the management processor 1 displays end data (at step S4-2). In this case, the management processor 1 displays a status as shown in FIG. 19.

In other words, the management processor 1 displays a message (Breakpoint #1: main ( ) at line 50 in a.c). This message represents that the source program has been advanced to a break point at line 50 with the "CONTINUE" command.

On the other hand, when the management processor 1 has not received reply information from all the PEs, the management processor 1 sets up a timer. When the management processor 1 has not received reply information until the timer has timed up, the management processor 1 displays a status as shown in FIG. 13B. In addition, with the "CONTINUE" command, the source program is displayed up to address 50 in the source display portion 32.

Likewise, this process applies to for example the "STEP" command as well as the "CONTINUE" command. However, whenever the "STEP" command is executed, a designated sequential debugger outputs reply information. The reply information is displayed on the display of the management processor corresponding to each step of the source program 1.

Thus, in this case, while comparing programs at the same step displayed on a plurality of sub-windows, the user can check out the programs.

Figure 20:
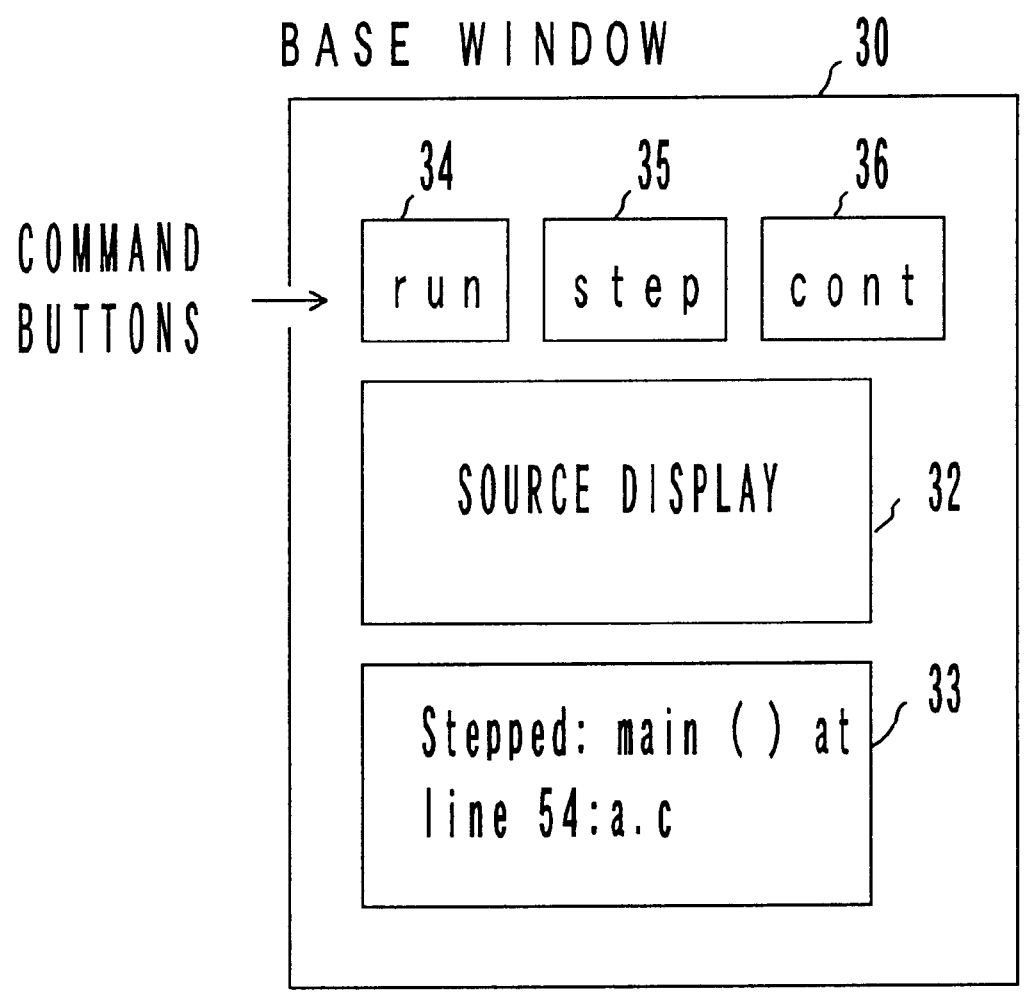
FIG. 20 is a schematic diagram showing data displayed in the status display portion after a "STEP" command is output.

When the "STEP" command has been executed, a status as shown in FIG. 20 is displayed. In other words, a message (Stepped: main ( ) at line 54 in a.c.) is displayed. This message represents that the source program has been advanced to line 54 with the "STEP" command.

<"P.STAT" Command>

Next, the process in the case that the "P.STAT" command is executed will be described.

Figure 21A:
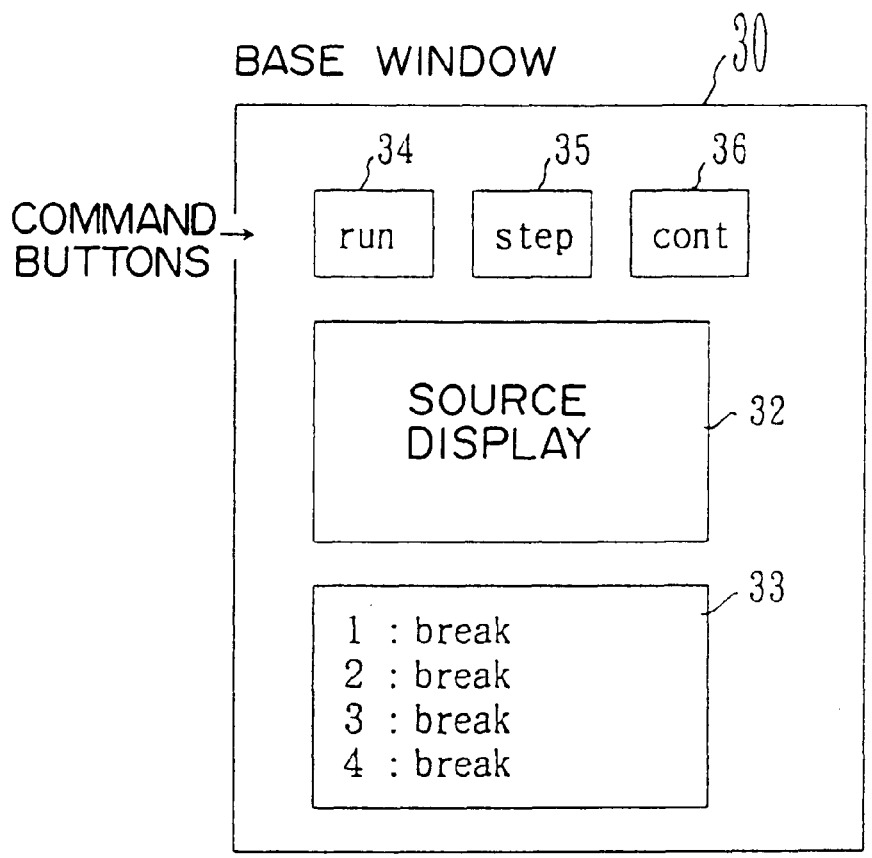
FIGS. 21A, 21B, and 21C are schematic diagrams showing examples of data displayed when the status displaying process is performed.
Figure 21B:
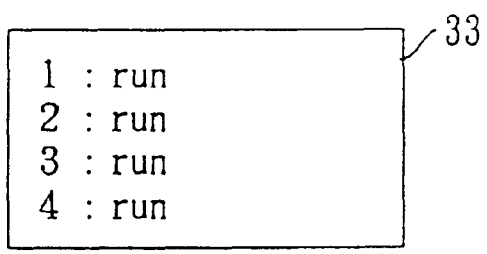
Figure 21C:
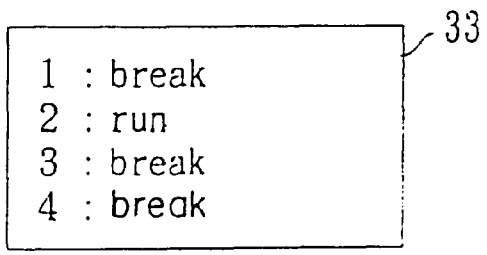

The "P.STAT" command is used to display a status of each sequential debugger. The "P.STAT" command is processed corresponding to the flow charts shown in FIGS. 8 to 10. For example, the status display portion 33 of the display 10 displays "BREAK" or "RUN". For example, as shown in FIG. 21A, when "1: break, 2: break, 3: break, 4: break" is displayed, it is determined that a source program that has been debugged is normal. In addition, as shown in FIG. 21B, when "1: run, 2: run, 3: run, 4: run" is displayed, it is determined that a source program that has been debugged is normal. On the other hand, as shown in FIG. 21C, when "1: break, 2: run, 3: break, 4: break" is displayed (namely, when the statuses of sequential debuggers are both breaks and runs), it is determined that a source program that has been debugged is abnormal. In other words, when the statuses of all sequential debuggers are all breaks, it is determined that the sequential debuggers have reached their break points. When the statuses of all sequential debuggers are all runs, it is determined that the sequential debuggers are operating. On the other hand, when the statuses of some sequential debuggers are breaks and the statuses of the other sequential debuggers are runs, it is supposed that a program that a sequential debugger that is in the run state processes is abnormal. Thus, in this case, a process designated by the user is performed.

Consequently, since the user can check out a plurality of sequential debuggers on the same screen, the debugging system according to the present invention is effective as a debugger for use with the data parallel processing apparatus. Thus, the debugging system can be used as a very useful debugging tool.

In the above-described case, by checking out the sequential debugger 21-4 that is continuously in the run state, the user can easily detect a bug of a source program to be debugged.

Figure 22:
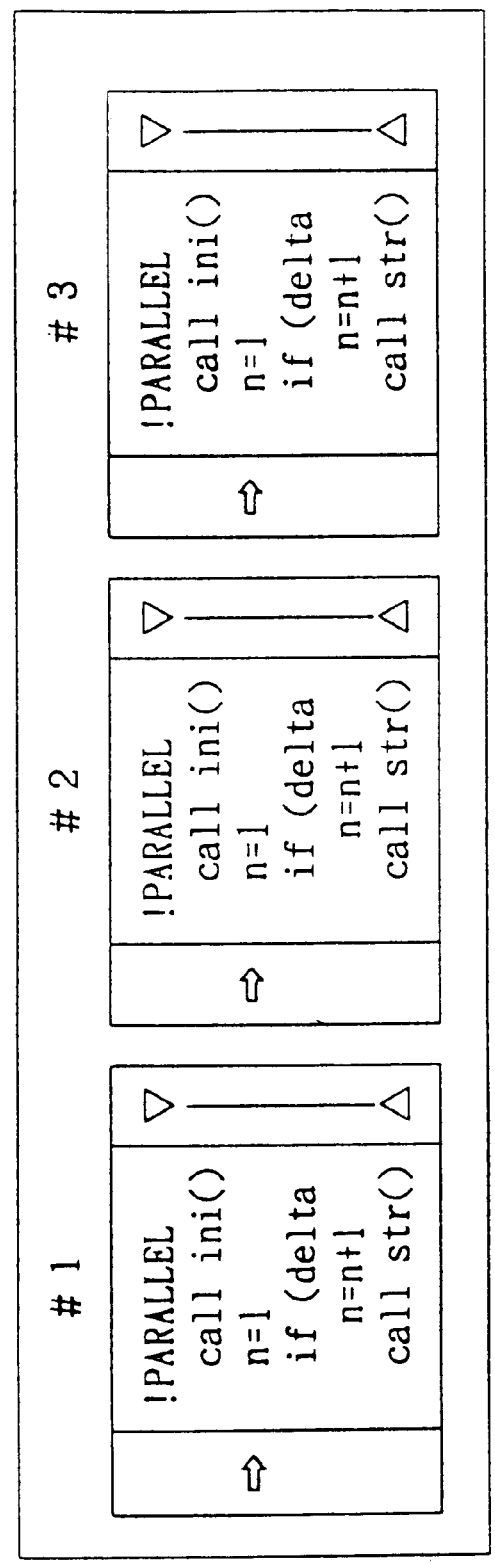
FIG. 22 is a schematic diagram showing an example of a source display in the case that the same position of a source program is debugged by a plurality of processes.
Figure 23:
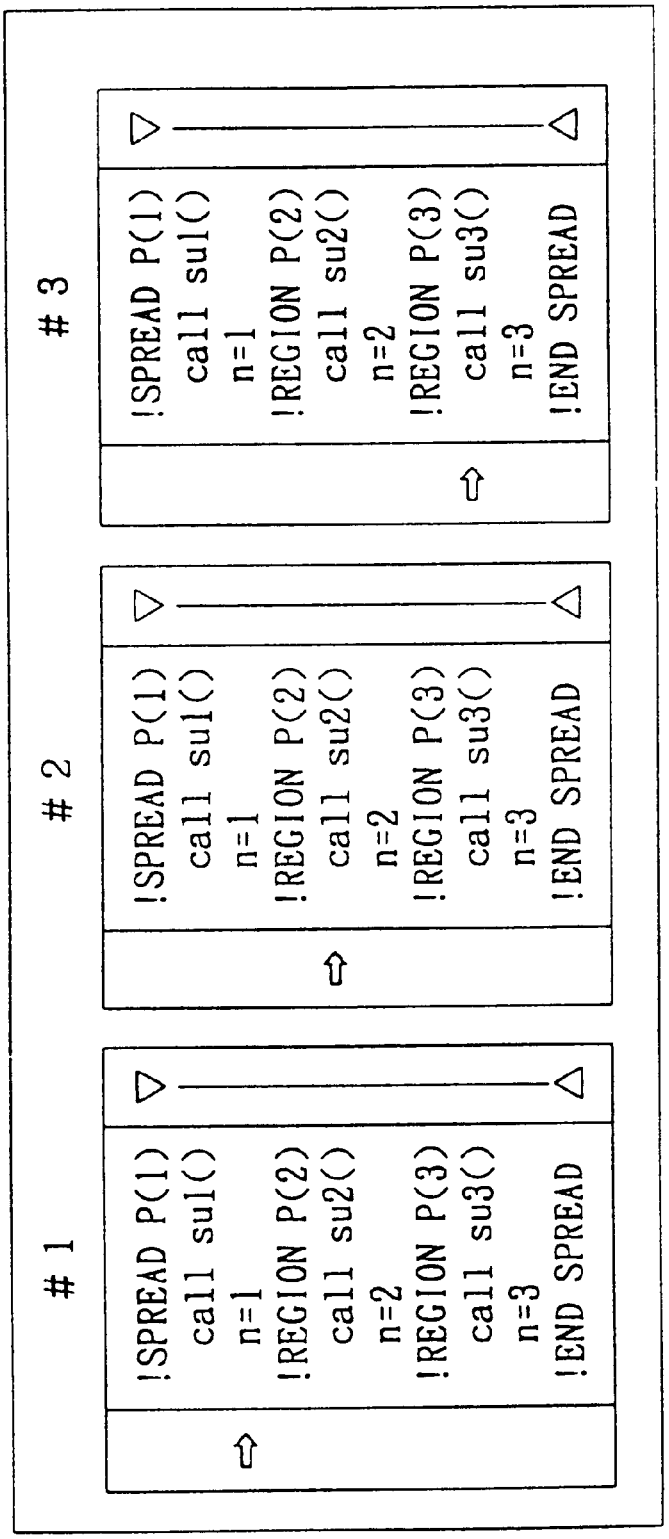
FIG. 23 is a schematic diagram showing an example of a source display in the case that different positions of a source program are debugged by a plurality of processes.

On the other hand, when the status of a source program is displayed, display results shown in FIGS. 22 and 23 can be obtained. In other words, when the display status of the display 10 is changed as shown in FIG. 6, with the "S.STAT" command, the process status of the source program can be determined. FIG. 22 shows a case of which parallel processes perform a process at the same address at the same time. FIG. 23 shows a case of which parallel processes perform a process at different addresses at a particular point. In other words, the parallel processes share the same process as different regions. In FIGS. 22 and 23, arrows on the left of screens represent current program positions.

Since the process statuses of parallel programs can be compared on the same display, the debugging system according to the present invention is effective as a debugger for use with a data parallel processing apparatus.

When a plurality of lines of reply information or the like are displayed in the state display portion 33 in the above-described process, the reply information is grouped and displayed for each sequential debugger as shown in FIG. 24.

In FIG. 24, data of a local memory is printed out. For example, when data is read from addresses "11", "12", "13", "31", "32", "33", and so forth of a local memory, the data is grouped for each sequential debugger and successively displayed. This process is accomplished by the end mark adding process (at step S9) shown in FIG. 9. Reply information buffered and received from each sequential debugger is confirmed with an end mark. The resultant reply information is grouped and displayed for each sequential debugger.

In the example shown in FIG. 23, data at addresses "11" to "13" read from the sequential debugger 21-1 are arranged as "25", "17", and "12". Thereafter, data at addresses "31" to "3" read from the sequential debugger 21-2 are arranged as "100", "75", and "70". Next, data read from the sequential debuggers 21-3 and 21-4 is arranged (not shown).

When the same data continues, it can be suppressed from being displayed as redundant data. For example, when "breaks" continue as shown in FIG. 21, one current process is designated and thereby only "1: break" may be displayed. Thus, the other "breaks" may be suppressed from being displayed. However, in the example shown in FIG. 21, the process should be performed after reply information of "breaks" of all the sequential debuggers has been confirmed.

In the above-described embodiment, four debuggers were used as sequential debuggers. However, as the number of parallel processes of the parallel processing apparatus increases, the number of sequential debuggers increases.

Figure 25:
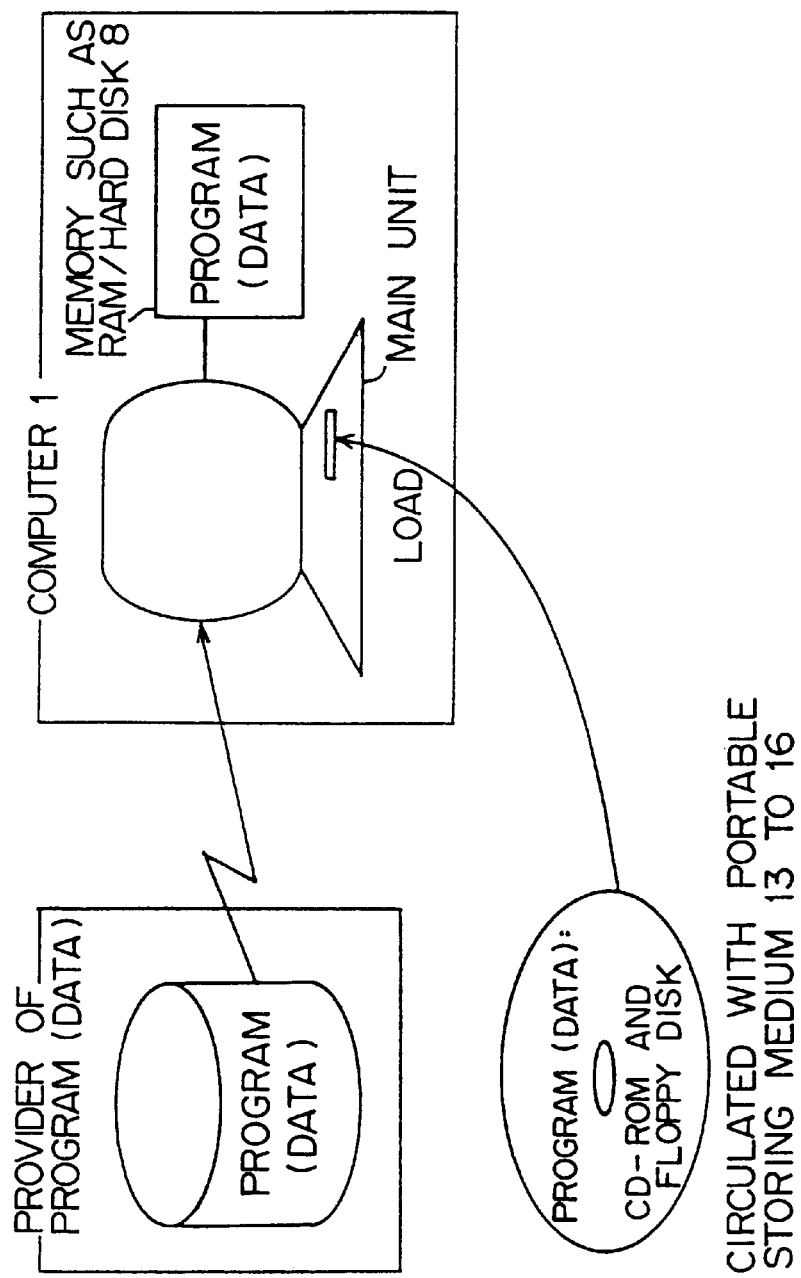
FIG. 25 is a schematic diagram for explaining a storing medium storing a program that accomplishes the embodiment of the present invention.

FIG. 25 is a schematic diagram showing a storing medium that stores a program with which the embodiment is accomplished.

As described above, according to the present invention, the following effects can be accomplished.

When parallel processed programs of a data parallel processing apparatus are debugged, since the user can use a management processor that manages each sequential debugger, the debugging process can be very effectively performed.

In addition, corresponding to the function of a debug command, since a plurality of processes can be performed at a time, the debugging process can be very quickly performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A debugging system for use with a data parallel processing apparatus having a plurality of processor elements for processing the same process in parallel, the debugging system comprising:
   a plurality of sequential debuggers to debug process programs of the processor elements, wherein each processor element has a local memory to store data peculiar to each said processor element and a common memory to store data common to all processor elements such that during execution of the respective debug process programs, each processor element outputs reply information in response to receipt of a debug command; and
   a management processor to output the debug command to said sequential debuggers, to cause said sequential debuggers to debug the process programs, to receive the reply information therefrom as debugged results, and to add identification to the reply information representing that the reply information from each respective sequential debugger has been received.

2. The debugging system as set forth in claim 1, further comprising:
   a server processor to control a corresponding sequential debugger at an instruction of said management processor, wherein said management processor outputs the debug command to said sequential debuggers through said server processor and to receive reply information from said sequential debuggers through the server processor, data between said management processor and the server processor being communicated on a socket communication basis, data between the server processor and said sequential debuggers being communicated on a pipe communication basis.

3. The debugging system as set forth in claim 1, wherein said management processor does not output the next debug command until said management processor receives reply information from all of said sequential debuggers.

4. The debugging system as set forth in claim 1, wherein said management processor displays a status when reply information is not received from all of said sequential debuggers.

5. The debugging system as set forth in claim 1, wherein the debug command uses a transmission function contained in a source program using variables stored in global memory.

6. The debugging system as set forth in claim 1, wherein the debug command is a status display command.

7. The debugging system as set forth in claim 1, wherein the debug command is output to a selected one of said sequential debuggers.

8. The debugging system as set forth in claim 7, wherein said management processor selects said sequential debuggers.

9. The debugging system as set forth in claim 1, wherein the debug command is output to all of said sequential debuggers.

10. The debugging system as set forth in claim 9, wherein said management processor selects said sequential debuggers.

11. The debugging system as set forth in claim 1, wherein the reply information is displayed in a basic window of a display of said management processor.

12. The debugging system as set forth in claim 11, wherein a process window for displaying the same source program of the processor elements or displaying different source programs of the processor element in parallel is generated on the display.

13. The debugging system as set forth in claim 1, wherein the status display is displayed in a basic window of a display of said management processor.

14. The debugging system as set forth in claim 13, wherein a process window for displaying the same source program of the processor elements or displaying different source programs of the processor element in parallel is generated on the display.

15. The debugging system as set forth in claim 1, wherein the reply information for each of said sequential debuggers is grouped and displayed.

16. The debugging system as set forth in claim 15, wherein the grouped reply information is displayed in an order of priority previously specified.

17. The debugging system as set forth in claim 15, wherein the reply information is not displayed when the reply information is redundant information.

18. A debugging management processor for use with a sequential debugger for a data parallel processing apparatus having a plurality of processor elements for processing the same process in parallel, wherein each processor element has a local memory to store data peculiar to each said processor element and a common memory to store data common to all processor elements, the debugging management processor comprising means for outputting a debug command to said a sequential debugger for debugging process programs of the processor elements, means for causing the sequential debugger to debug the process programs, means for receiving reply information as the debugged result from the sequential debugger, and means for managing a debugging process of the data parallel processing apparatus by adding identification to the reply information representing that the reply information from each respective sequential debugger has been received.

19. A readable storage medium for storing a program for causing a computer to perform:
   (a) outputting a debug command to a process element for processing the same parallel program, wherein the process element has a local memory to store data peculiar to the process element and a common memory to store data common to a plurality of process elements; and
   (b) receiving reply information of which a data parallel processed program of the process element has been debugged corresponding to the debug command that has been output by the operation (a) and managing a debugging process of the data parallel processed program by adding identification to the reply information representing that the reply information from the process element has been received.

20. A debugging method of a data parallel processed program of which a plurality of process elements process the same processes in parallel, comprising:
   (a) outputting a debug command to the process elements, wherein each process element has a local memory to store data peculiar to each said process element and a common memory to store data common to all process elements;
   (b) debugging data parallel processed programs of the process elements corresponding to the debug command that has been output at the operation (a); and
   (c) receiving reply information as a result at the operation (b) and managing a debugging process of the data parallel processed program by adding identification to the reply information representing that the reply information from each respective process element has been received.

21. The debugging method as set forth in claim 20, wherein the debug command is a status display command.

22. The debugging method as set forth in claim 21, wherein the debug command uses a transmission function contained in a source program.

23. The debugging method as set forth in claim 20, wherein the operation (a) and the receiving of the operation (c) are performed corresponding to a server process.

24. The debugging method as set forth in claim 23, wherein the debug command is a status display command.

25. The debugging method as set forth in claim 24, wherein the reply information is displayed in a basic window of a display of the management processor.

26. The debugging method as set forth in claim 24, wherein the status display is displayed in a basic window of a display of the management processor.

27. The debugging method as set forth in claim 26, wherein a process window for displaying the same source program of the processor elements or displaying different source programs of the processor element in parallel is generated on the displayprocessor.

28. The debugging method as set forth in claim 23, wherein the debug command uses a transmission function contained in a source program.

29. The debugging method as set forth in claim 28, wherein the reply information is displayed in a basic window of a display of the management.

30. The debugging method as set forth in claim 28, wherein the status display is displayed in a basic window of a display of the management processor.

31. The debugging method as set forth in claim 30, wherein a process window for displaying the same source program of the processor elements or displaying different source programs of the processor element in parallel is generated on the display.

32. A debugging system for use with a data parallel processing apparatus having a plurality of processor elements for processing a program in parallel, the debugging system comprising:
   a plurality of sequential debuggers to debug process programs of the processor elements, wherein each processor element has a local memory to store data peculiar to each said processor element and a common memory to store data common to all processor elements;
   a management processor to output a debug command to said sequential debuggers, causing said sequential debuggers to debug the process programs, to receive reply information therefrom as the debugged results, and to manage a debugging process for the data parallel processing apparatus by adding identification to the reply information representing that the reply information from each respective sequential debugger has been received; and
   a window, formed on a display of said management process, to display the same source program or different source programs of the processor elements.

33. A readable storage medium for storing a program for causing a computer to perform:
   (a) outputting a debug command to a plurality of process elements for processing the same parallel program, wherein each process element has a local memory to store data peculiar to each said process element and a common memory to store data common to all process elements; and
   (b) receiving reply information from a sequential debugger to debug data parallel processed programs of the process elements corresponding to the debug command that has been output at the operation (a) and to manage a debugging process of the process programs by adding identification to the reply information representing that the reply information from each respective processing element has been received.

34. A debugging system for use with a data parallel processing apparatus having a plurality of processor elements for processing the same process in parallel, the debugging system comprising:
   a plurality of sequential debuggers to debug process programs of the processor elements, wherein each processor element transmits reply information in response to receipt of a debug command such that during execution of the respective debug process programs each processor adds identification information to the reply information indicating that the reply information from each respective sequential debugger has been received; and a management processor to output the debug command to said sequential debuggers, to cause said sequential debuggers to debug the process programs, and to receive the reply information therefrom as debugged results.

35. A debugging system for use with a data parallel processing apparatus having a plurality of processor elements for processing the same process in parallel, the debugging system comprising:

a plurality of sequential debuggers to debug process programs of the processor elements, wherein each processor element transmits reply information in response to receipt of a debug command;

a management processor to output the debug command to said sequential debuggers, to cause said sequential debuggers to debug the process programs; and a server processor to control a corresponding sequential debugger in response to an instruction of said management process such that the server processor adds identification information to the reply information indicating that the reply information from each respective sequential debugger has been received.

* * * * *

UNITED STATES PATENT AND TRADEMARK OFFICE
CERTIFICATE OF CORRECTION

PATENT NO. : 6,279,104 B1
DATED : August 21, 2001
INVENTOR(S) : Yuji Sato et al.

Page 1 of 1

It is certified that error appears in the above-identified patent and that said Letters Patent is hereby corrected as shown below:

Column 17,
Line 67, delete "processor"

Signed and Sealed this

Fourteenth Day of May, 2002

Attest:

Attesting Officer

JAMES E. ROGAN
*Director of the United States Patent and Trademark Office*